US006879755B2

(12) United States Patent
Morin et al.

(10) Patent No.: US 6,879,755 B2
(45) Date of Patent: Apr. 12, 2005

(54) OPTICAL STRUCTURE FOR THE COMPENSATION OF CHROMATIC DISPERSION AND DISPERSION SLOPE IN A LIGHT SIGNAL

(75) Inventors: Michel Morin, Sillery (CA); Yves Painchaud, Sillery (CA); Sylviane Lelievre, Québec (CA); Richard Lachance, Sainte-Foy (CA)

(73) Assignee: Teraxion Inc., Sainte-Foy (CA)

( * ) Notice: Subject to any disclaimer, the term of this patent is extended or adjusted under 35 U.S.C. 154(b) by 0 days.

(21) Appl. No.: 10/351,583

(22) Filed: Jan. 24, 2003

(65) Prior Publication Data

US 2003/0161580 A1 Aug. 28, 2003

Related U.S. Application Data

(63) Continuation-in-part of application No. 10/232,106, filed on Aug. 28, 2002, which is a continuation-in-part of application No. 10/101,229, filed on Mar. 18, 2002.
(60) Provisional application No. 60/307,365, filed on Jul. 25, 2001.

(51) Int. Cl.[7] .................................................. G02B 6/34
(52) U.S. Cl. ......................... 385/37; 385/27; 385/123; 398/81
(58) Field of Search ....................... 385/37, 32, 27, 385/10, 123; 359/563, 566, 572; 398/81, 82, 84

(56) References Cited

U.S. PATENT DOCUMENTS

| 5,384,884 A | | 1/1995 | Kashyap et al. ............. 385/129 |
| 5,627,927 A | * | 5/1997 | Udd ............................. 385/37 |
| 5,841,920 A | * | 11/1998 | Lemaire et al. ................ 385/37 |

(Continued)

FOREIGN PATENT DOCUMENTS

EP  1 061 672 A2  12/2000

OTHER PUBLICATIONS

J. Azana et al. "Real–Time Fourier Transformations Performed Simultaneously Over Multiwavelength Signals," IEEE Phototonics Technology Letters, vol. 13, No. 1, Jan. 2001.

J. Cai et al.: "Sampled nonlinearly–chirped fiber–Bragg–grating for the tunable dispersion compensation of many WDM channels simultaneously," 1999, Piscataway, NJ, USA, IEEE, USA, Feb. 21, 1999.

T. Komukai et al.: "Fabrication of non–linearly chirped fiber Bragg gratings for higher–order dispersion compensation," Optics Communications, North–Holland Publishing Co., Amsterdam, NL vol. 154, No. 1–3, Aug. 1998.

(Continued)

*Primary Examiner*—Jared J. Fureman
(74) *Attorney, Agent, or Firm*—Darby & Darby

(57) ABSTRACT

A dispersion compensator for the compensation of chromatic dispersion in a multi-channel light signal is provided. The compensator includes a pair of optical structures each having a waveguide and a Bragg grating provided therein. The Bragg grating has a plurality of grating components, each associated with one or a few of the channels to be compensated. An optical assembly propagates the light signal sequentially through both optical structures. The periods of the grating components are selected to allow compensation of chromatic dispersion experienced by this particular channel or these particular channels, thereby taking into account the dispersion slope of the light signal. Tuning means are also provided in order to adjust the dispersion of the grating components of each optical structures, and proper selection of the tuning parameters allows tuning independently both the dispersion and dispersion slope.

12 Claims, 19 Drawing Sheets

U.S. PATENT DOCUMENTS

| | | | | |
|---|---|---|---|---|
| 5,903,689 | A | | 5/1999 | Painchaud et al. ............ 385/37 |
| 5,982,963 | A | | 11/1999 | Feng et al. .................... 385/37 |
| 5,987,200 | A | | 11/1999 | Fleming et al. |
| 6,072,926 | A | | 6/2000 | Cole et al. .................... 385/37 |
| 6,097,862 | A | * | 8/2000 | Abramov et al. ............. 385/37 |
| 6,275,629 | B1 | * | 8/2001 | Eggleton et al. .............. 385/37 |
| 6,317,539 | B1 | * | 11/2001 | Loh et al. ...................... 385/37 |
| 6,351,585 | B1 | * | 2/2002 | Amundson et al. ........... 385/37 |
| 6,363,187 | B1 | * | 3/2002 | Fells et al. .................... 385/37 |
| 6,411,746 | B1 | * | 6/2002 | Chamberlain et al. ........ 385/37 |
| 6,427,040 | B1 | * | 7/2002 | Ahuja et al. ................... 385/37 |
| 6,438,277 | B1 | * | 8/2002 | Eggleton et al. .............. 385/37 |
| 6,453,095 | B2 | * | 9/2002 | Feng et al. .................... 385/37 |
| 6,563,985 | B2 | * | 5/2003 | Yin et al. ...................... 385/37 |
| 6,628,861 | B1 | * | 9/2003 | Yao .............................. 385/37 |
| 6,643,429 | B2 | * | 11/2003 | Robinson et al. ............. 385/37 |
| 6,671,437 | B2 | * | 12/2003 | Margalit ....................... 385/37 |
| 6,807,340 | B2 | * | 10/2004 | Postolek et al. .............. 385/37 |
| 6,810,179 | B2 | * | 10/2004 | Ohira et al. ................... 385/37 |
| 2003/0161580 | A1 | * | 8/2003 | Morin et al. ................... 385/37 |
| 2003/0194179 | A1 | * | 10/2003 | Rumpf et al. .................. 385/37 |
| 2003/0218124 | A1 | * | 11/2003 | Johnson et al. ........ 250/227.14 |
| 2003/0223687 | A1 | * | 12/2003 | Blomquist et al. ............ 385/37 |
| 2004/0013364 | A1 | * | 1/2004 | Johnson et al. ............... 385/37 |
| 2004/0017971 | A1 | * | 1/2004 | Johannessen ................ 385/37 |

OTHER PUBLICATIONS

T. Komukai et al.: "The Design of Dispersion Equalizers Using Chirped Fiber Bragg Gratings," IEEE Journal of Quantum Electronics, vol. 36, No. 4, Apr. 2000.

J. Azana et al.: "Superimposed in–fiber grating structures for optical signal processing in wave–length–division–multiplexing systems," Optical–Fiber Communication Conference (OFC), Technical Digest Postconference Edition. Baltimore,MD, Mar. 7–10, 2000, New York, NY: IEEE, US vol. 2 of 4.

International Search Report, Sep. 2003.

F. Ouellette, "Dispersion cancellation using linearly chirped Bragg grating filters in optical waveguides", Opt. Lett. 12, pp. 847–849, Oct. 1987.

"Realization of > 10–m–long chirped fiber Bragg gratings" J. F. Brennan and D.L. LaBrake, in BGPP 1999, pp. 35–37, no month available.

M. Durkin, M. Ibsen, M.J. Cole and R.I. Laming, "1 m long continuously–written fibre Bragg gratings for combined second–and third–order dispersion compensation", Electron. Lett. 33, pp. 1891–1893 (1997).

A.E. Willner, K.–M.Feng, J.Cai, S. Lee, J. Peng, and H. Sun, "Tunable Compensation of channel degrading effects using nonlinearly chirped passive fiber Bragg gratings", IEEE J. of Selected Topics in Quantum Electron., 5, pp. 1298–1311, Sep. 1999.

A.V. Buryak, and D.Y. Stepanov, "Novel multi–channel grating designs", Proceedings of BGPP 2001, no date available.

M. Ibsen,M.K. Durkin, and R.I. Laming "Chirped moire fiber gratings operating on two–wavelength channels for use as dual–channel dispersion compensators," IEEE Photon. Technol. Lett., 10 pp. 84–86, Jan. 1998.

M. Ibsen, M.K. Durkin, M.J. Cole, and R.I. Laming "Sinc–sampled fiber bragg gratings for identical multiple wavelength operation", IEEE Photon Technol. Lett. 10, pp. 842–844 (1998), no month available.

J.A.R. Williams, L.A. Everall, I. Bennion, "Fiber Bragg grating fabrication for dispersion slope compensation", IEEE Photon, Technol. Lett. 8 pp. 1187–1189, Sep. 1996.

Y. Xie, S. Lee, Z. Pan, J.–X Cai, A.E. Willner, V. Grubsky, D.S. Starodubov, E. Salik, and J. Feinberg, "Tunable Compensation of the Dispersion Slope Mismatch in dispersion–managed systems using a sampled nonlinearly chirped FBG", IEEE Photon. Technol. Lett. 12, pp. 1417–1419, Oct. 2000.

Y. Painchaud, A. Chandonnet. and J. Lauzon, "Chirped fibre gratings produced by tilting the fibre", Electron. Lett. 31, pp. 171–172, Feb. 1995.

M.J. Cole, W.H. Loh, R.I. Laming, M.N. Zervas, and S. Barcelos, "Moving fibre//phase mask–scanning beam technique for enhanced flexibility in producing fibre gratings with uniform phase mask", Electron. Lett. 31, pp. 1488–1490 (1995).

J.A.J. Fells, S.E. Kanellopoulos, P.J. Bennett, V. Baker, H.F.M. Priddle, W.S. Lee, A.J. Collar, C.B. Rogers, D.P. Goodchid, R. Feced, B.J. Pugh, S.J. Clements, and A. Hadjifotiou, "Twin fibre grating adjustable dispersion compensator for 40 Gbit/s", Proc. ECOC 2000.

Q. Zhou and J.J. Pan, "Sampled Fiber Grating Based–Dispersion Slope Compensator", IEEE Photon. Technology letters vol. 11, No. 10 (Oct. 1999).

* cited by examiner

Group delay of a broadband dispersion compensator based on ultralong chirped FBG.

Group delay of a broadband dispersion compensator based on sampled chirped FBG in which all the channels are identical.

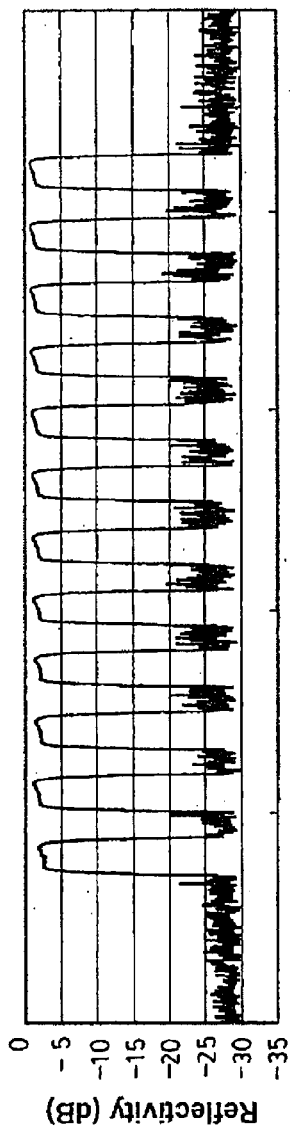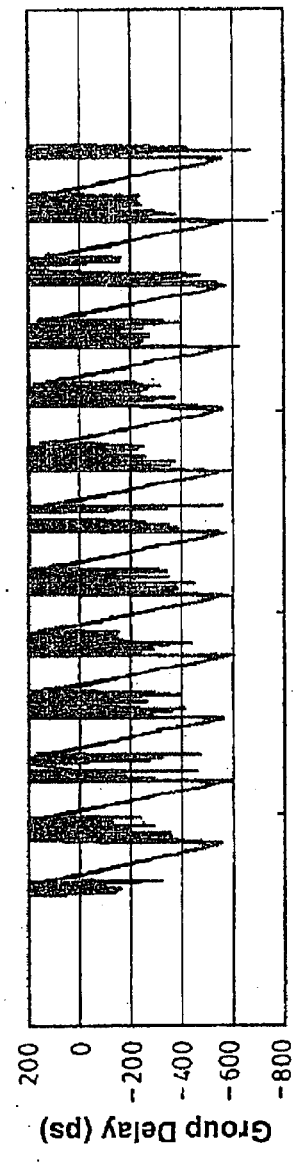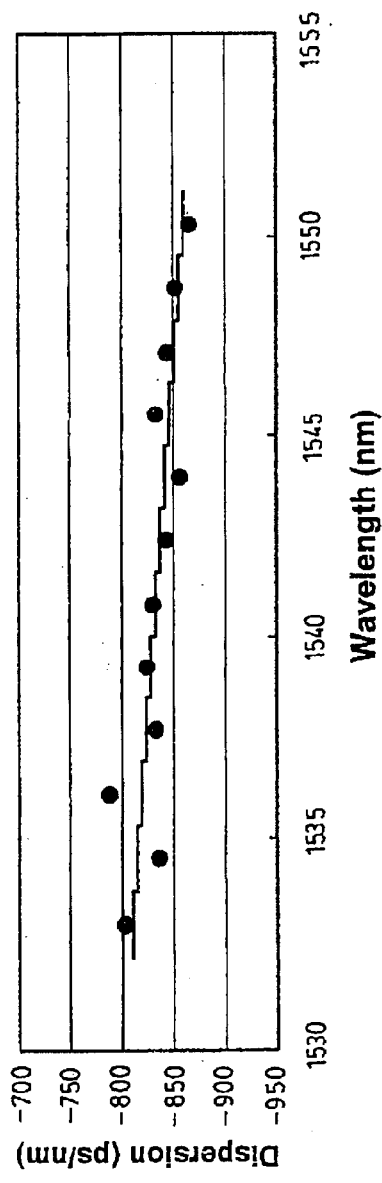
FIG. 9A
FIG. 9B
FIG. 9C

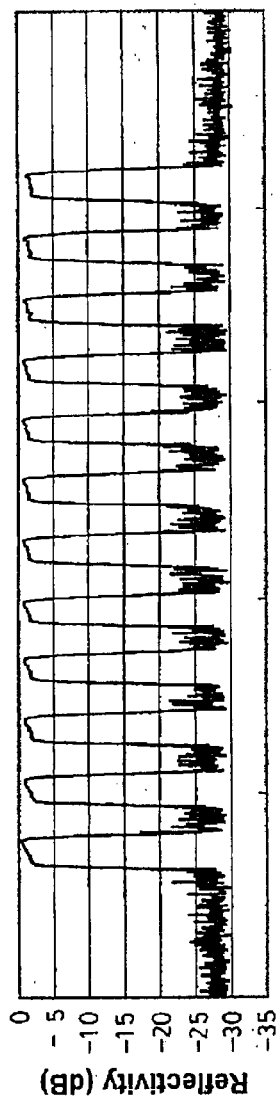
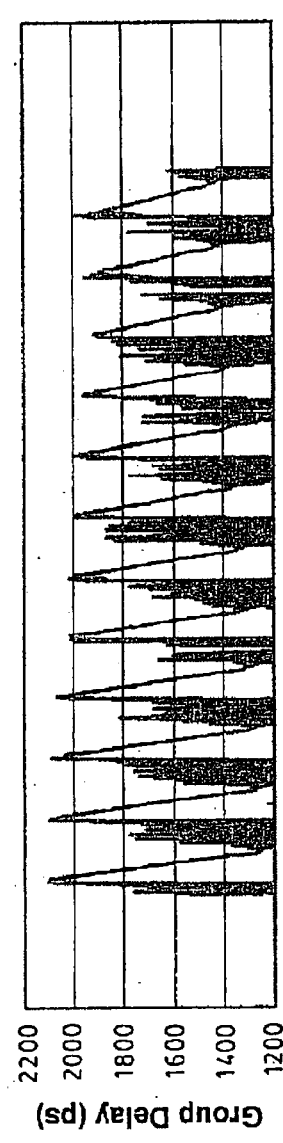
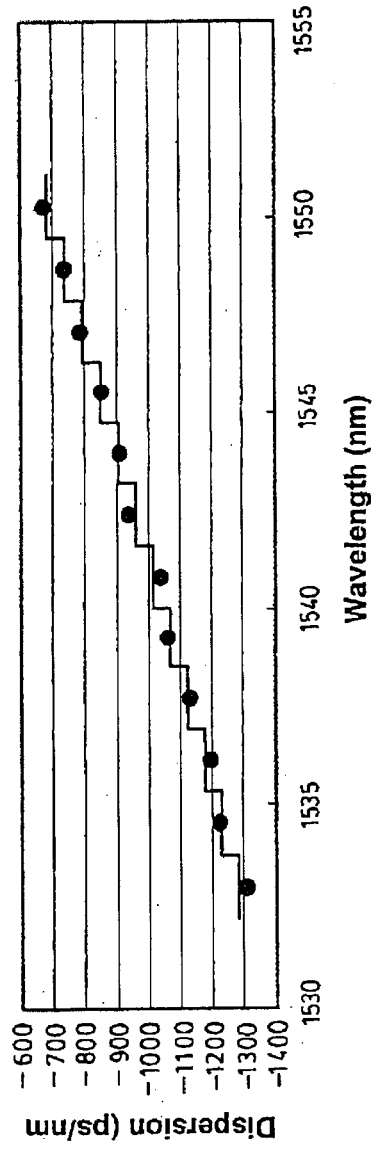
FIG. 10A
FIG. 10B
FIG. 10C

OPTICAL STRUCTURE FOR THE COMPENSATION OF CHROMATIC DISPERSION AND DISPERSION SLOPE IN A LIGHT SIGNAL

RELATED APPLICATION

The present application is a Continuation in Part of U.S. application Ser. No. 10/232,106, filed on Aug. 28, 2002, itself a Continuation in Part of U.S. application Ser. No. 10/101,229, filed on Mar. 18, 2002, which claims benefit of 60/307,365, filed Jul. 25, 2001.

FIELD OF THE INVENTION

The present invention relates to the compensation of chromatic dispersion occurring in waveguides such as optical fibers. More specifically, the invention concerns an optical structure for dispersion compensation based on a Bragg grating, and operating at several wavelengths or Wavelength-Division-Multiplexing (WDM) channels.

BACKGROUND OF THE INVENTION

In optical telecommunication systems, one of the many difficulties encountered is the chromatic dispersion of light signals propagating over long distances in optical fibers. The chromatic dispersion in non-dispersion-shifted optical fiber is nominally 17 ps/nm/km in the 1550 nm telecommunication window, but this value changes as a function of the wavelength: its value changes by about 2 ps/nm/km between 1530 nm and 1565 nm. Several single-channel dispersion compensators based on Fiber Bragg gratings (FBGs) have been proposed. Although they were demonstrated to be appropriate solutions for compensating the chromatic dispersion in a single WDM channel, in multi-channel systems, the spectral variation of the chromatic dispersion must be taken into account, especially for data transmission systems operating at high rates such as 10 and 40 Gbit/s. There is therefore a need for a broadband dispersion compensator that compensates for the chromatic dispersion but also for its spectral variation. This feature is often referred to as the dispersion slope compensation.

Fiber Bragg gratings are a well established technology for the fabrication of components for optical telecommunications, especially for WDM. Basically, a Bragg grating allows light propagating into an optical fiber to be reflected back when its wavelength corresponds to the grating's Bragg wavelength, related to its period. A chirped Fiber Bragg Grating, in which the Bragg wavelength varies as a function of the position along the fiber, represents a well known solution for compensating the chromatic dispersion of an optical fiber link (F. Ouellette, <<Dispersion cancellation using linearly chirped Bragg grating filters in optical waveguides,>> Opt. Lett., 12, pp. 847–849, 1987; R. Kashyap, <<Fiber Bragg gratings,>> Academic Press, 458p., 1999). This spatially variable Bragg wavelength is defined as the product of twice the spatially variable grating period and the fiber effective index, which can also be spatially variable. Such a chirped grating compensates for the accumulated dispersion by reflecting light with a group delay that varies as a function of the wavelength. An appropriate grating can be fabricated such that the wavelength dependence of its group delay is just the opposite of that of the fiber link. Different solutions based on FBGs have been proposed for broadband dispersion compensation but most of them do not include the slope compensation.

Referring to M Durkin et al. <<1 m long continuously written fibre Bragg grating for combined second- and third-order dispersion compensation>>, Electron. Lett. 33, pp 1891–1893 (1997) and J. F. Brennan et al. in BGPP 1999, pp.35–37, ultra-long FBGs, up to 10 m long, have been demonstrated for dispersion compensation over a large bandwidth. However, such devices suffer from high group delay ripples and do not allow an adjustment of the dispersion. The group delay of a compensator based on ultra-long FBGs is schematically illustrated in FIG. 1 (prior art). The chromatic dispersion the device compensates for is given by the slope of the group delay. The example shown in FIG. 1 has a dispersion of —1250 ps/nm and thus compensates for the chromatic dispersion accumulated over a 73 km long fiber link.

Sampled FBGs and Moiré FBGs have also been proposed in U.S. Pat. No. 5,384,884 (KASHYAP et al.) In particular for multi-channel dispersion compensation (see for example A. E. Willner, et al., <<Tunable compensation of channel degrading effects using nonlinearly chirped passive fiber Bragg gratings,>> IEEE J. of Selected Topics in Quantum Electron., 5, pp.1298–1311 (1999); U.S. Pat. No. 5,982,963 (FENG et al.); A. V. Buryak et al., <<Novel multi-channel grating designs>>, Proceedings of BGPP 2001; and M. Ibsen et al., <<Chirped moiré fiber gratings operating on two-wavelength channels for use as dual-channel dispersion compensators,>> IEEE Photon. Technol. Lett., 10, pp.84–86, (1998)) in which the sampling function replicates a given dispersion function (M. Ibsen et al, <<Sinc-sampled fiber Bragg gratings for identical multiple wavelength operation>> IEEE Photon. Technol. Lett., 10, pp.842–844, 1998). As a result, all the channels are identical and the device cannot compensate for the dispersion slope. The group delay of such a compensator based on a sampled FBG is schematically illustrated in FIG. 2 (prior art). An approach for multi-channel slope compensation has been proposed based on interleaved sampled Bragg gratings in W. H. Loh et al. <<Sampled fiber grating based dispersion slope compensator>>, Photonics Technol. Lett. 11, no 10, pp 1280–1282 (1999). This theoretical approach is expected to suffer from significant practical difficulties associated with the control of the many micro-grating structures.

Single-channel non-linearly chirped FBGs have been proposed for narrowband dispersion slope compensation (J. A. R. Williams et al., <<Fiber Bragg grating fabrication for dispersion slope compensation>>, IEEE Photon. Technol. Lett., 8, pp. 1187–1189, 1996). In order to achieve operation over a broader range, multi-channel non-linearly chirped FBGs were proposed (Y. Xie et al., <<Tunable compensation of the dispersion slope mismatch in dispersion-managed systems using a sampled nonlinearly chirped FBG>>, IEEE Photon. Technol. Lett., 12, pp.1417–1419, 2000). In this approach, the replicated bands of a sampled FBG have a different wavelength separation than the WDM channels, causing each channel to experience a different dispersion compensation.

In view of the above, there is a need for a dispersion compensating device that takes into account the slope of the dispersion experienced by a broadband multi-channel signal.

In addition, critical factors such as changing traffic patterns, temperature fluctuations along the fiber, component dispersion levels and dispersion variations in the transmission fiber (from manufacturing variances) affect dispersion compensation, especially at high bit rate. To accommodate these factors, 40 Gb/s systems and some 10 Gb/s systems require not only fixed, broadband slope-compensated dispersion-compensating devices, but also tunable dispersion technology to adjust the dispersion compensation in real-time for different WDM channels.

The wavelength of peak reflection for a Bragg grating can be shifted by a change in either the strain or the temperature (or both) imposed on the grating. If the grating is subjected to a strain or temperature gradient, the modulation period of the index of refraction and the mean index of refraction become functions of position along the grating.

If a linearly chirped FBG is uniformly stretched, its period is changed, and accordingly the Bragg reflection wavelength is also changed, but the dispersion remains unchanged. A similar situation pertains if, instead of stretching the fiber, a uniform heating is applied to the grating. On the other hand, a non uniform heating, such as to produce a thermal gradient along the waveguide axis in the region of the grating, induces a chirp in the grating. Controlling the magnitude of the thermal gradient controls the magnitude of the resulting chirp, and thus there is provided a form of adjustable dispersion compensation device. Such a device is for instance described by different implementations described hereafter.

U.S. Pat. No. 5,671,307 (LAUZON et al.) discloses the use of a temperature gradient to impose a chirp on a FBG. By inducing a uniform linear variation of the local temperature over the length of the FBG, a slope variation of the time delay can be obtained, resulting in a variation of the dispersion compensation. The temperature gradient is realized by providing heat conductive means such as a thin brass plate to hold the portion of the fiber provided with the Bragg grating, and pairs of Peltier effect plates sandwiching each end of the fiber to selectively apply and dissipate heat to and from the ends of the fiber. Lauzon suggests that the device might be used as an accurately tunable dispersion compensator for optical fiber communication links. However, the proposed device lacks the power efficiency required to make it practical. This purely thermal approach has the advantage of avoiding any stresses in the fiber.

Based on the same idea, European patent No. 0 997 764 (EGGLETON et al.) discloses an optical waveguide grating with adjustable chirp formed by a waveguide grating in thermal contact with an electrically controllable heat-transducing body which varies the temperature along the length of the grating. The heat transducing body, formed by example by a tapered film coating whose resistance varies along the length of the grating, can generate heat on the fiber to establish a temperature gradient along the grating.

It is also known in the prior art to use a plurality of localized heaters along the length of a chirped FBG to alter its properties in order to tune the chirp and to produce tunable dispersion compensators. U.S. patent application Ser. No. 2002/048430 (HASHIMOTO) presents such an approach where an optical fiber is coupled to a succession of localized heaters mounted on a substrate. Linear temperature profiles are obtained which tune the dispersion in the linearly chirped FBG placed in close contact. The plurality of localized heaters can also be controlled such as to produce a non-linear temperature profile along the grating.

The previous embodiments refer to the application of a thermal gradient to a fiber Bragg grading. Similarly, if the waveguide is subjected to a stretching that is not uniform, but is such as to produce a strain gradient along the waveguide axis, then the effect is to produce a controllable amplitude of chirp. Imai (T. Imai et al., <<Dispersion Tuning of a Linearly Chirped Fiber Bragg Grating Without a Center Wavelength Shift by Applying a Strain Gradient>>, IEEE June 1998, pp. 845–847) and U.S. Pat. No. 6,360,042 (LONG) describe devices in which a strain gradient is imparted to an optical fiber waveguide by bonding a portion of its length to a cantilever, and then bending that cantilever. U.S. Pat. No. 5,694,501 (ALAVIE) is another example of such a device in which a strain gradient is imparted to an optical fiber by cantilever bending and also by bonding it to the side of a stack of electrostrictive elements, and then applying a differential drive to those elements. The use of magnetostriction for grating chirping can also be used, as disclosed by U.S. Pat. No. 6,122,421 (ADAMS et al.). This patent discloses a programmable and latchable device for chromatic dispersion compensation based on a gradient magnetostrictive body bonded along the length of the fiber grating. In such a device, the magnetic field causes the body to expand or contract depending on the material. Alternatively, European patent no. 0 867 736 (FARRIES et al.) discloses a temperature-based device that combines the application of a temperature gradient and a strain to modify the optical properties of the grating. All of these devices however imply gluing the fiber to a metallic block along its entire length, which in practice is a technologically challenging operation.

The uniform stretching of an optical waveguide possessing a chirped Bragg grating with a quadratic component of its chirp can also induce a change in the linear dispersion afforded by the structure, as described in U.S. Pat. No. 5,982,963 (FENG) and Y. Xie et al., <<Tunable compensation of the dispersion slope mismatch in dispersion-managed systems using a sampled nonlinearly chirped FBG>>, IEEE Photon. Technol. Lett., 12, pp.1417–1419, 2000. This approach allows a tuning of the dispersion but the spectral duty factor is limited to about 25%. Furthermore, this method relies on mechanical stretching which may cause fiber fatigue and degrade long-term reliability.

Another tunable dispersion compensator based on uniformly straining quadratically chirped FBGs is presented in U.S. Pat. No. 6,363,187 (FELLS) and in U.S. Pat. No. 6,381,388 (EPWORTH). In an effort to combat the transmission penalty associated with a quadratic chirp, this patent uses the reflection in a second Bragg grating identical to the first, but oriented to provide a quadratic component of chirp that has the opposite sign to that of the first Bragg reflection grating, and with a substantially matched modulus.

All of the above prior art techniques have their advantages and drawbacks, but none provides a simple optical structure which allows for the tunable dispersion and dispersion slope compensation of a multi-channel light signal.

OBJECTS AND SUMMARY OF THE INVENTION

It is an object of the present invention to provide an optical structure allowing the compensation for both the chromatic dispersion and dispersion slope of light signals.

It is another object of the present invention to provide a dispersion compensator allowing the compensation for both the chromatic dispersion and the dispersion slope of light signals and a tuning of both of these parameters independently.

Accordingly, in accordance with a first aspect of the invention, there is provided an optical structure for the compensation of chromatic dispersion in a light signal having a plurality of wavelength channels, each wavelength channel having accumulated a different chromatic dispersion.

The optical structure includes an optical waveguide having a light propagation axis, and a Bragg grating provided in the waveguide across the light propagation axis. The Bragg grating has a plurality of grating components each associated with one or a few of the wavelength channels, and having a spatially variable period chosen to compensate for the chromatic dispersion of this or these wavelength channels.

In accordance with a second aspect of the invention, there is also provided a multi-channel dispersion compensator for the compensation of chromatic dispersion in a light signal having a plurality of wavelength channels, each wavelength channel having accumulated a different chromatic dispersion.

The compensator includes an optical structure having an optical waveguide having a light propagation axis, and a Bragg grating provided in this waveguide across the light propagation axis. The Bragg grating has a plurality of grating components each reflecting one or a few of the wavelength channels and having a spatially variable period chosen to compensate for the dispersion of this or these wavelength channels.

The compensator also includes an optical coupling device coupled to the optical waveguide. The optical coupling device has an input port for receiving the light signal, an input/ouput port for propagating this light signal in the optical structure and receiving a reflection thereof by the Bragg grating, and an output port for outputting the reflected light signal.

In accordance with a third aspect of the present invention, there is also provided a multi-channel dispersion compensator for the compensation of chromatic dispersion in a light signal having a plurality of wavelength channels, each wavelength channel having accumulated a different chromatic dispersion. The compensator includes an optical waveguide having a light propagation axis. A plurality of optical structures are provided in this waveguide across the light propagation axis, each of these optical structures comprising a Bragg grating having a plurality of grating components. Each grating component reflects one or a few of the wavelength channels, and has a spatially variable period chosen to compensate for the dispersion of this or these channels. The compensator also includes an optical coupling device coupled to the optical waveguide. The optical coupling device has an input port for receiving the light signal, an input/ouput port for propagating this light signal in the optical waveguide and receiving a reflection thereof by the Bragg gratings of the optical structures, and an output port for outputting the reflected light signal.

In accordance with another aspect of the present invention, there is provided a tunable dispersion compensator for the compensation of chromatic dispersion in a light signal having a plurality of wavelength channels, each wavelength channel having accumulated a different chromatic dispersion.

The dispersion compensator includes a pair of tunable optical structures each of these optical structures includes the following:

an optical waveguide having a light propagation axis;
a Bragg grating provided in the waveguide across the light propagation axis, this Bragg grating having a plurality of grating components. Each grating component is associated with a limited number of wavelength channels and has a characteristic spatially variable Bragg wavelength selected to compensate for a given chromatic dispersion; and
tuning means for tuning the spatially variable Bragg wavelength of each of the grating components;

The dispersion compensator also includes an optical coupling assembly having an input port for receiving the light signal, a pair of input/output ports for sequentially propagating the light signal in the optical structures of the pair of optical structures and receiving a reflection thereof by the corresponding Bragg grating, and an output port for outputting the light signal after reflection by the Bragg grating of both optical structures.

In a preferred embodiment, the tuning of the spatially variable Bragg wavelength of the grating components is achieved by applying a temperature gradient to each of the optical structures.

Other features and advantages of the present invention will be better understood upon reading of preferred embodiments thereof with reference to the appended drawings.

BRIEF DESCRIPTION OF THE DRAWINGS

FIGS. 9A and 9B respectively show the reflectivity and group delay spectra of a 12-channel third-order dispersion compensation grating;

FIG. 9C is a graph where the dots represent the dispersion values obtained from a linear curve fit of the group delays while the solid line represents the target.

FIGS. 10A and 10B respectively show the reflectivity and group delay spectra of a 12-channel dispersion slope compensation grating;

FIG. 10C is a graph where the dots represent the dispersion values obtained from a linear curve fit of the group delays while the solid line represents the target.

DESCRIPTION OF PREFERRED EMBODIMENTS OF THE INVENTION

Figure 1:
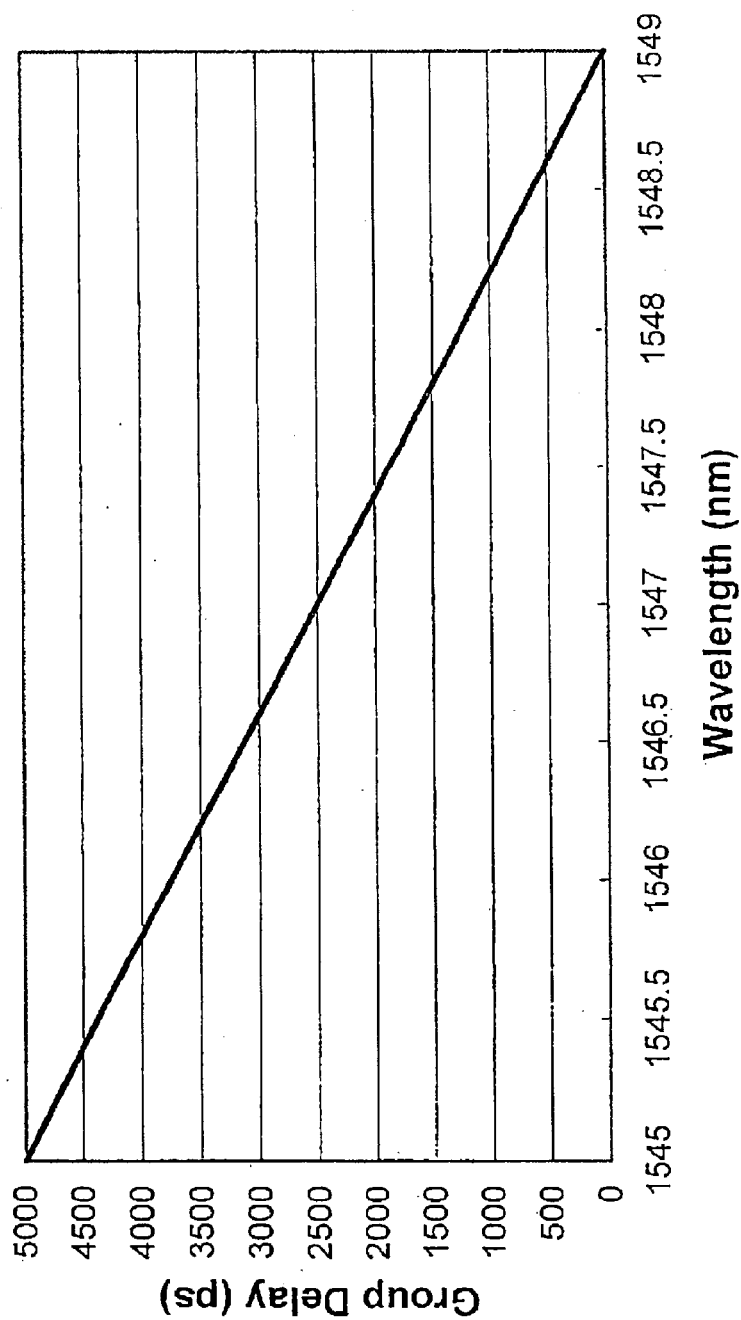
FIG. 1 (PRIOR ART) is a graph of the group delay of a broadband dispersion compensator based on ultralong chirped Fiber Bragg Gratings.
Figure 2:
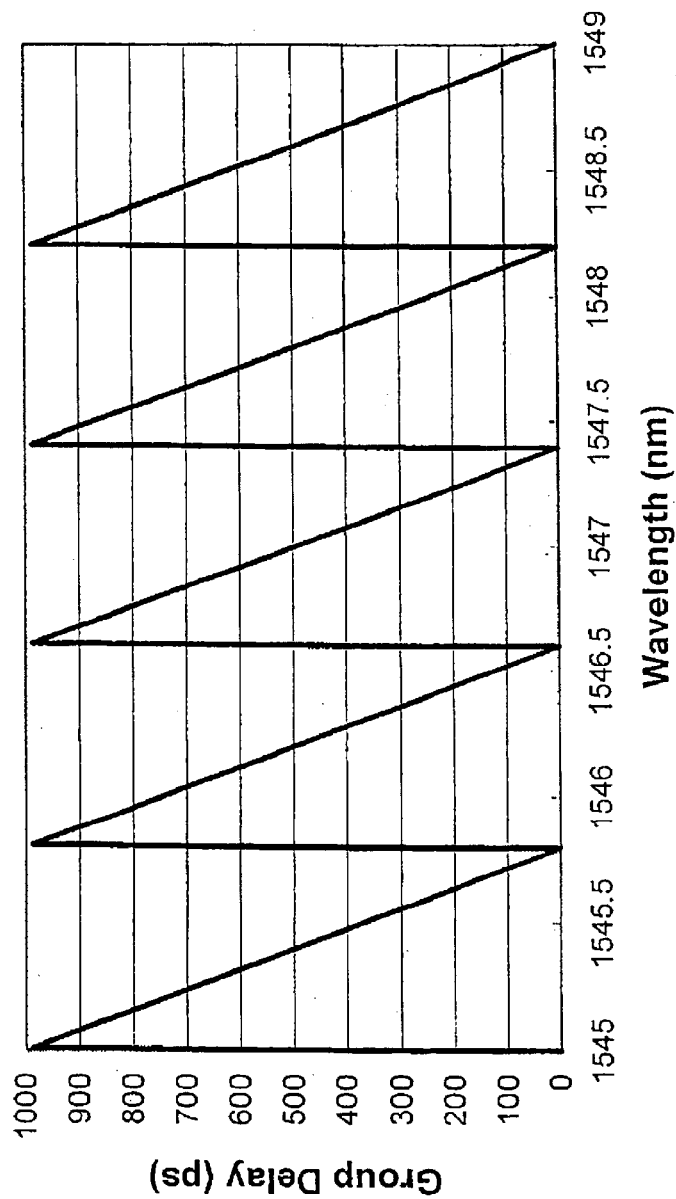
FIG. 2 (PRIOR ART) is a graph of the group delay of a broadband dispersion compensator based on sampled chirped Fiber Bragg Gratings in which all the channels are identical.

The present invention provides an optical structure which can compensate for the chromatic dispersion accumulated by a light signal over a certain propagation distance, but also for the channel-to-channel dispersion variations.

A single-channel Bragg grating is described by its longitudinal index profile which can be written as:

$$n(z) = n_{eff}(z) + \Delta n(z) \sin\left( \int_0^z \frac{2\pi}{p(z')} dz' \right), \quad (1)$$

where z is the position along the axis of the waveguide, $n_{eff}(z)$ is the averaged effective index (considered to vary only slowly along the axis), $\Delta n(z)$ is the amplitude of the index modulation which can vary along the axis in order to include, for example, an apodization profile, and p(z) is the grating period, which can also vary along the axis. For commodity, the z axis is defined such that z=0 corresponds to the center of the grating.

A Bragg grating can compensate for the chromatic dispersion when it is linearly chirped, that is, when its period varies linearly along the z axis according to:

$$p(z) = p_a + \alpha \cdot z \quad (2)$$

The grating reflects light having a wavelength equal (or close) to the Bragg wavelength given by:

$$\lambda_B(z) = 2 n_{eff} p(z) \quad (3)$$

The Bragg wavelength $\lambda_B(z)$ varies along the grating when the period varies monotonously as a function of z. Light having a wavelength $\lambda_B(z)$ is reflected by the grating at location z while light having a wavelength $\lambda_B(z+\Delta z)$ is reflected at location $z+\Delta z$. With respect to the light of wavelength $\lambda_B(z)$, the light of wavelength $\lambda_B(z+\Delta z)$ is delayed in time by a group delay $\Delta t_g$ given by:

$$\Delta t_g = \frac{2 \Delta z n_g}{c}, \quad (4)$$

where $n_g$ is the group index of the fiber and c is the light velocity in vacuum. The dispersion D is the wavelength derivative of the group delay. Assuming that $\Delta z$ is small, D is given by:

$$D = \frac{\Delta t_g}{\lambda_B(z+\Delta z) - \lambda_B(z)} = \frac{n_g^2}{c n_{eff}^2 \left( \frac{d}{dz} p(z) \right)}. \quad (5)$$

In the case of p(z) given by Equation (2), the dispersion of the grating reduces to:

$$D = \frac{n_g^2}{c n_{eff}^2 \alpha}. \quad (6)$$

Higher order dispersion compensation can also be achieved by using a non-linearly chirped Bragg grating having a period given by:

$$p(z) = p_o + \alpha \cdot z + \beta \cdot z^2 + \gamma \cdot z^3 + \ldots \quad (7)$$

A multi-channel Bragg grating is basically a combination of several Bragg grating components and reflects light having a wavelength equal (or close) to several Bragg wavelengths. Its longitudinal index profile can be written as:

$$n(z) = n_{eff}(z) + \sum_{i=1}^{m} \Delta n_i(z) \sin\left( \int_0^z \frac{2\pi}{p_i(z')} dz' + \phi_i \right), \quad (8)$$

where m is the number of grating components, $\Delta n_i(z)$ are the spatially-dependent index modulation amplitudes, $\phi_i$ are the phases of each of the components and $p_i(z)$ are the spatially-dependent periods given by:

$$p_i(z) = p_{oi} + \alpha_i z + \beta_i z^2 + \gamma_i z^3 + \ldots \quad (9)$$

A multi-channel Bragg grating can be used as a broadband third-order dispersion compensator if the periods $p_i(z)$ are properly chosen. A third-order compensation refers to the compensation of both the dispersion and dispersion slope, while a second-order compensation refers to the compensation of a single dispersion value for all the channels. Suppose that m channels centered at wavelengths $\lambda_i$ (i=1 to m) must be compensated with dispersion values $D_i$ respectively. Assuming that intra-channel compensation is achieved at the second-order only, the periods $p_i(z)$ must be given by:

$$p_i(z) = \frac{\lambda_i}{2 n_{eff}} + \frac{n_g^2}{c n_{eff}^2 D_i} \cdot z. \quad (10)$$

It can be noted that the relative component phases $\phi_i$ may be chosen arbitrarily, even randomly, or selected in order to minimize the maximum index value along the grating.

The present invention therefore provides an optical structure for the compensation of chromatic dispersion in a light signal having a plurality of wavelength channels, based on the principles explained above.

Figure 3:
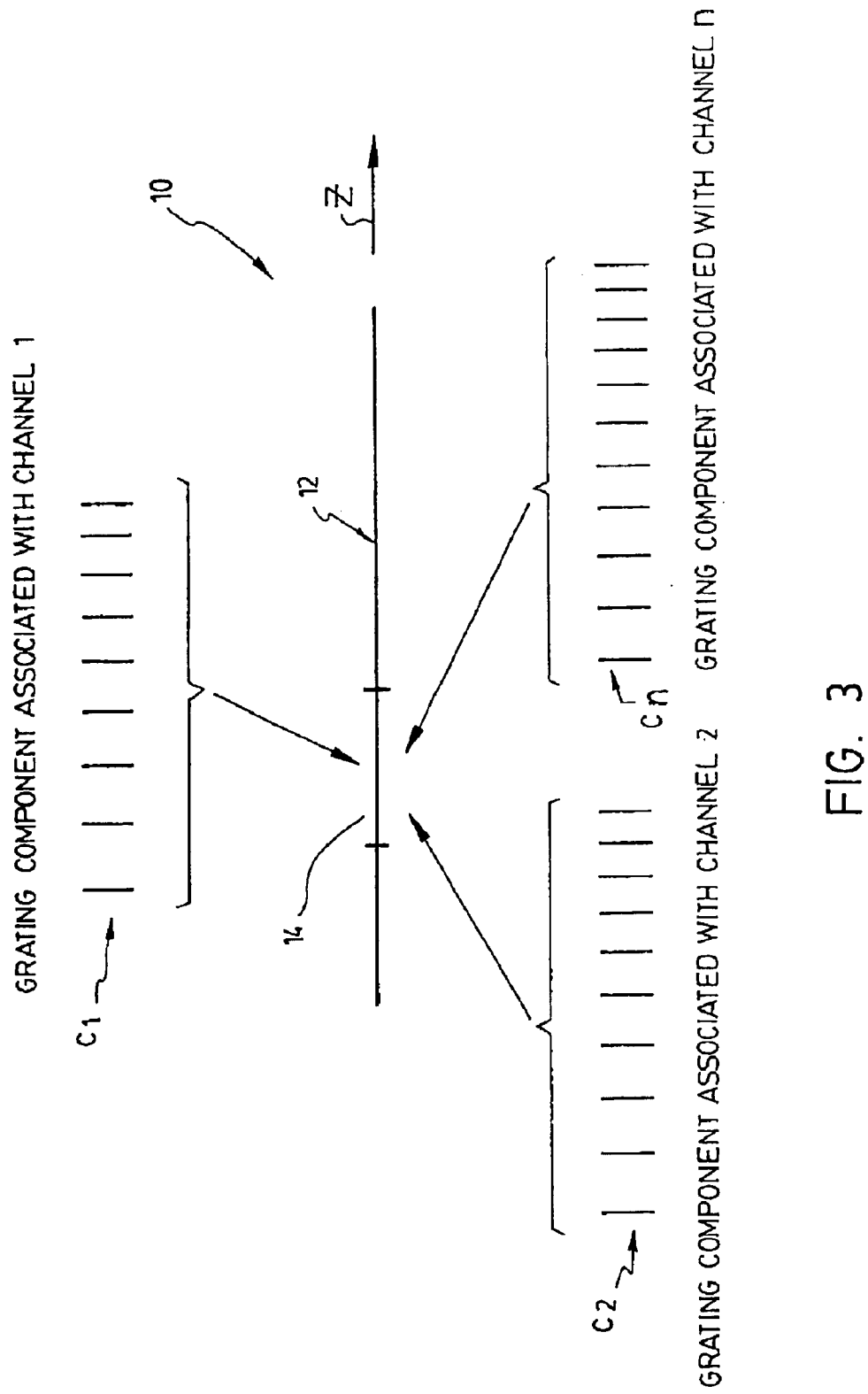
FIG. 3 is a schematic representation of an optical structure according to a first preferred embodiment of the invention.

Referring to FIG. 3, there is illustrated an optical structure 10 according to a preferred embodiment of the present invention. It includes an optical waveguide 12, such as a length of optical fiber, having a light propagation axis z. A Bragg grating 14 is provided in the waveguide 12, across the light propagation axis z. The Bragg grating 14 is made of a plurality of grating components ($c_1$, $c_2$, . . . $c_n$). Each component is associated with a limited number of the wavelength channels of the light signal, a single one or a few, and has a spatially variable period chosen to compensate for the chromatic dispersion of this or these particular channels. In this manner, the dispersion compensation provided by the Bragg gratings takes into account the variations in dispersion experienced by each different channel. As one skilled in the art will readily understand, the limited number of channels is selected to include a few neighboring channels having dispersion characteristics close enough to be efficiently compensated by a single grating component. Typically, less than 10 channels would be an appropriate number, although a higher number could be considered if the properties of a given system allowed it. In the embodiments described hereinafter, each grating component will be considered associated with only one wavelength channel, for simplicity, but it is understood that the invention should not be limited to such an embodiment.

Preferably, the Bragg grating 14 consists in a longitudinal refractive index profile in the optical waveguide 12 as defined by equation (8). As explained above, the relative phase $\phi_i$ of each grating component can be selected in order to minimize the maximum value of the longitudinal index profile n(z) along the propagation axis, or can be alternatively arbitrarily or randomly selected. Each grating component is preferably linearly chirped, and is preferably chosen according to equation (10). Alternatively, the grating components may be non-linearly chirped.

In the embodiment of FIG. 3, the grating components are superimposed and thereby form a compact structure. This may for example be achieved by using one different phase mask per grating component. As another example, the same Bragg grating may be manufactured by using a single phase mask, changing the Bragg wavelength by stretching the fiber and finely adjusting the chirp of each component using chirp adjustment techniques, such as for example disclosed in Y. Painchaud et al. <<Chirped fibre gratings produced by tilting the fibre>>, Electron. Lett., 31, pp 171–172 (1995); M. Cole et al., <<Moving fibre/phase mask scanning beam technique for enhanced flexibility in producing fibre gratings with uniform phase mask>>, Electron. Lett. 31, pp 1488–1490 (1995); and U.S. Pat. No. 5,903,689 (PAINCHAUD et al.) and U.S. Pat. No. 6,072,926 (COLE et al.). Another alternative would be to use holographic writing techniques which allow flexibility in the grating characteristics. A complex multi-period phase mask may also be used for an easy fabrication of the multi-channel grating. In the alternative the novel technique disclosed in U.S. Pat. No. 6,501,883 to the same assignee, filed on Mar. 18$^{th}$ 2002 and entitled <<METHOD AND APPARATUS FOR RECORDING AN OPTICAL GRATING IN A PHOTOSENSITIVE MEDIUM>>, could be used.

Figure 4:
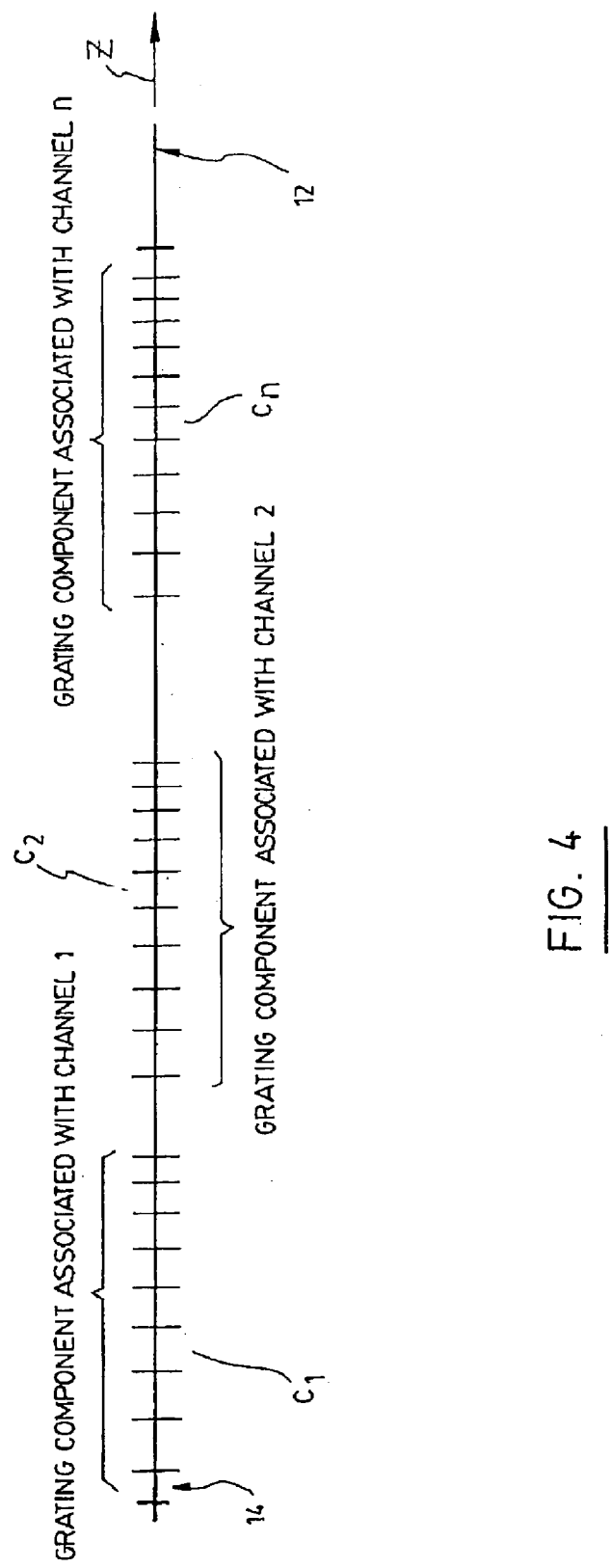
FIG. 4 is a schematic representation of an optical structure according to a second preferred embodiment of the invention.

Referring to FIG. 4, there is illustrated another embodiment of the present invention where the grating components are concatenated, and may for example be manufactured using one of the techniques described above.

Figure 5:
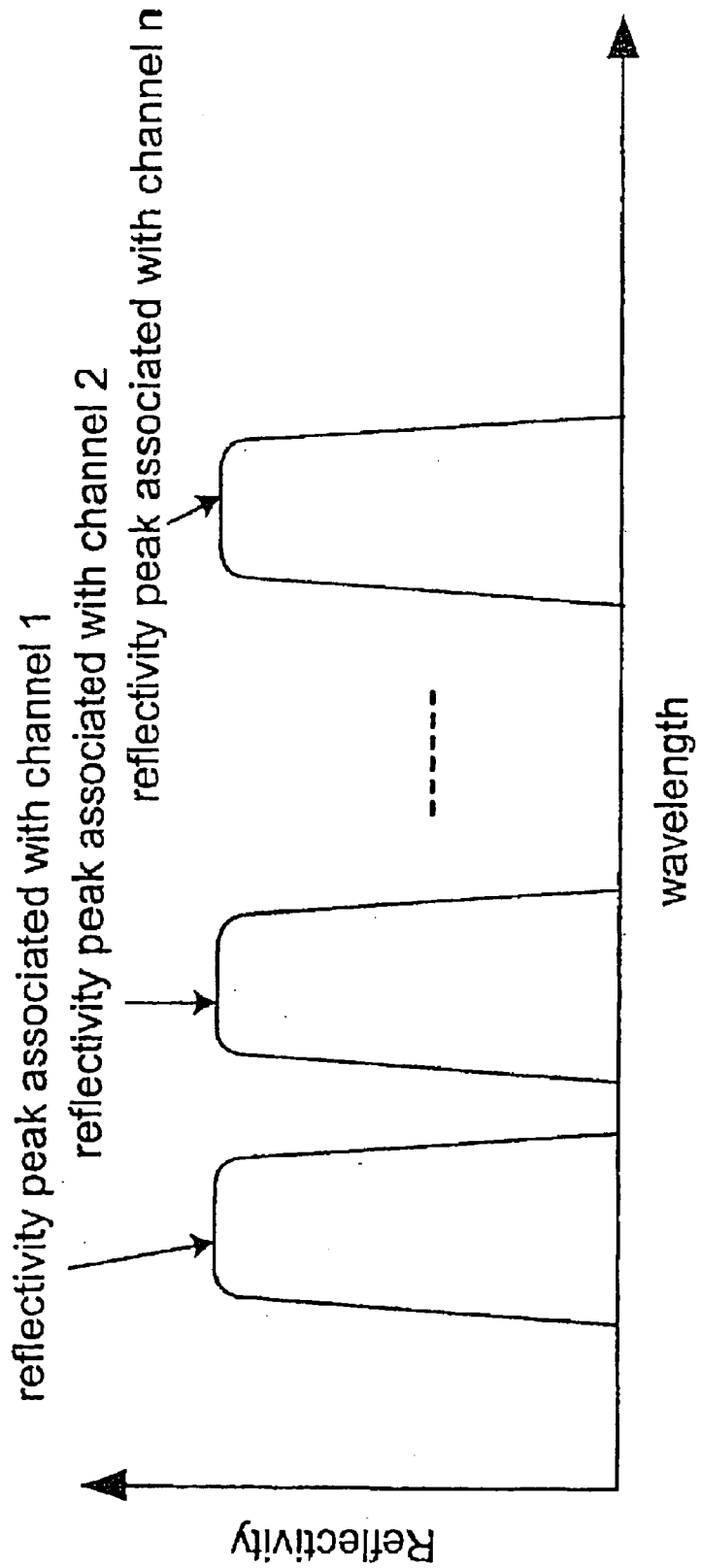
FIG. 5 is a graphical representation of the reflectivity spectrum of an optical structure according to the invention.
Figure 6:
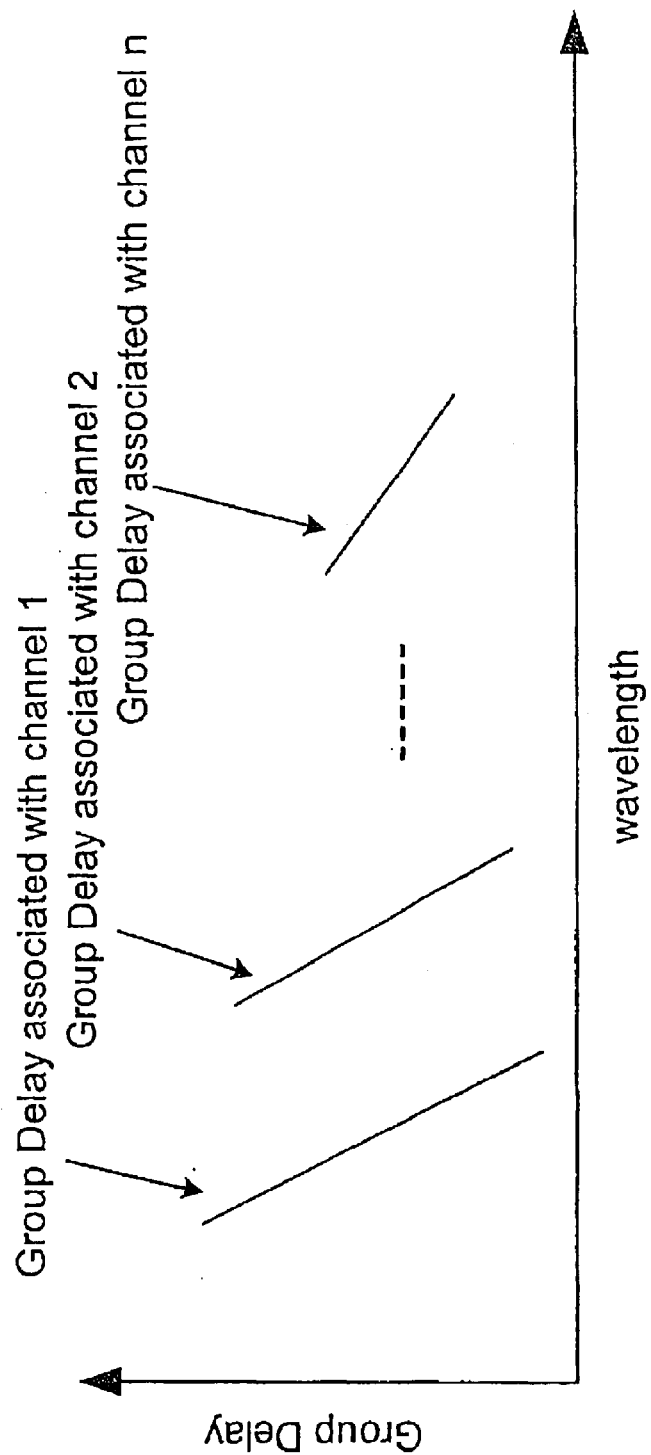
FIG. 6 is a graphical representation of the group delay slope for each channel reflected by an optical structure according to the invention.

FIGS. 5 and 6 respectively show the reflectivity peaks of the resulting structure for each grating component, and their group delays. As may be seen, the group delay slope may be selected to be different for each channel in order to be tailored to the dispersion experienced by each particular channel.

Referring to FIGS. 7A, 7B, 8A and 8B, the present invention also provides a multi-channel dispersion compensator 20.

Figure 7A:
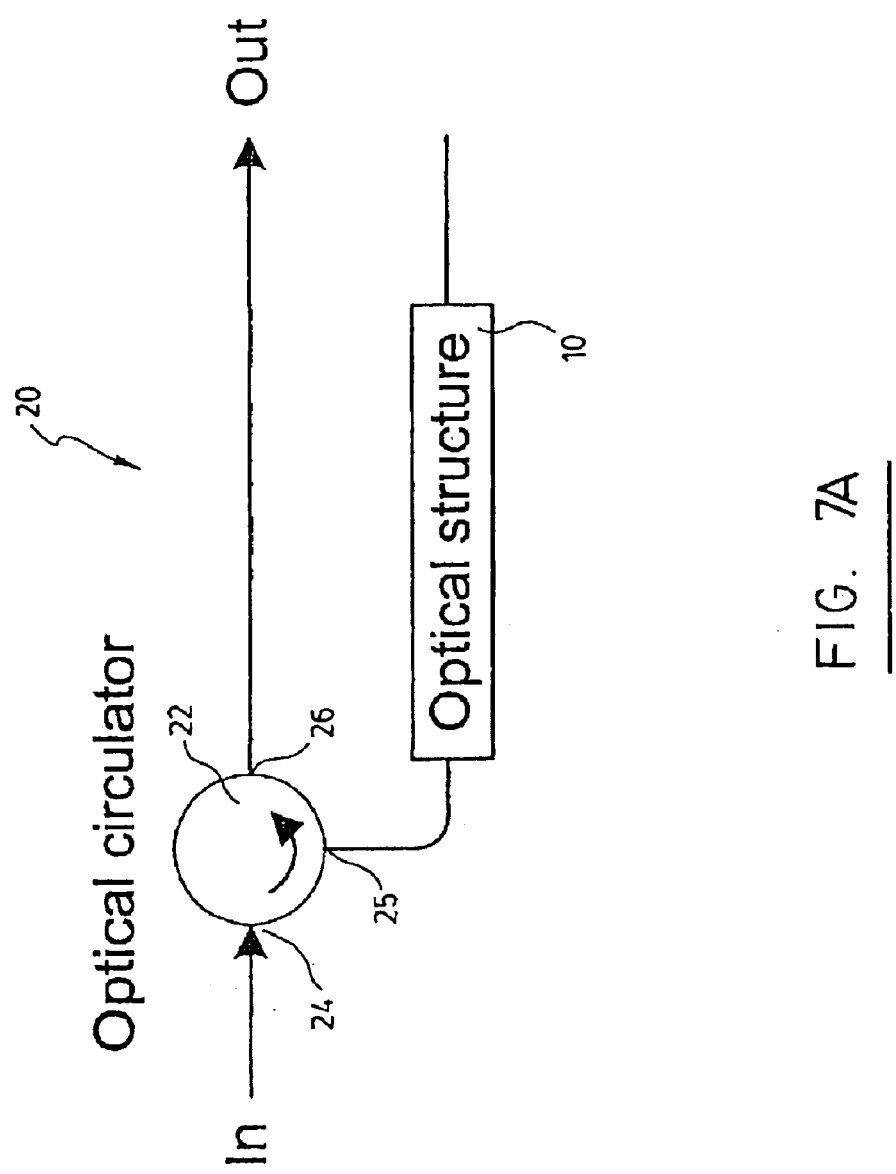
FIG. 7A is a schematic representation of a multi-channel dispersion compensator according to a preferred embodiment of the present invention.
Figure 7B:
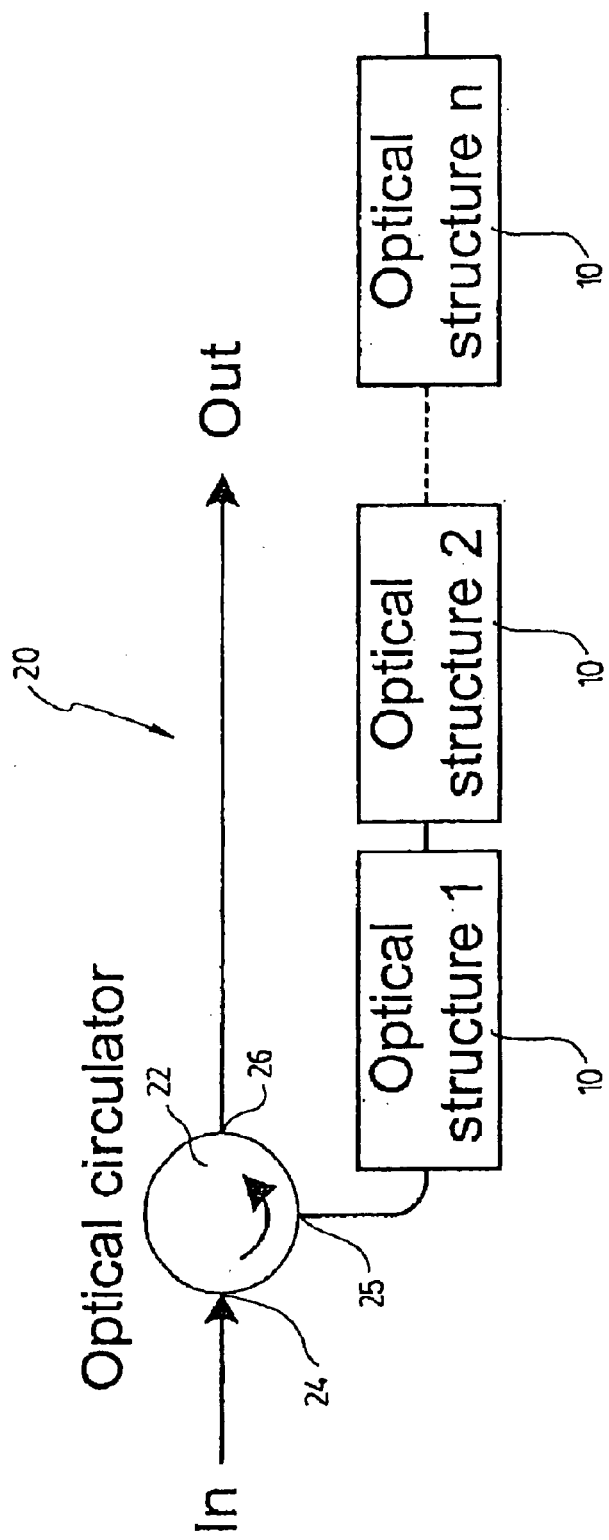
FIG. 7B shows a variant to the embodiment of FIG. 7A.
Figure 8A:
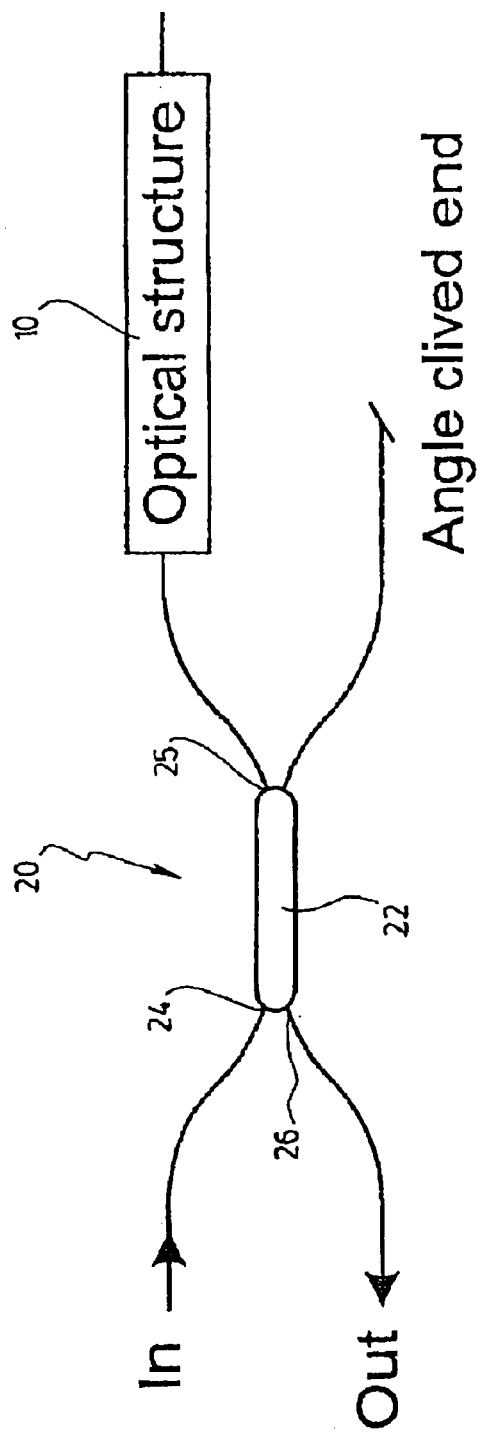
FIG. 8A is a schematic representation of a multi-channel dispersion compensator according to another preferred embodiment of the present invention.
Figure 8B:
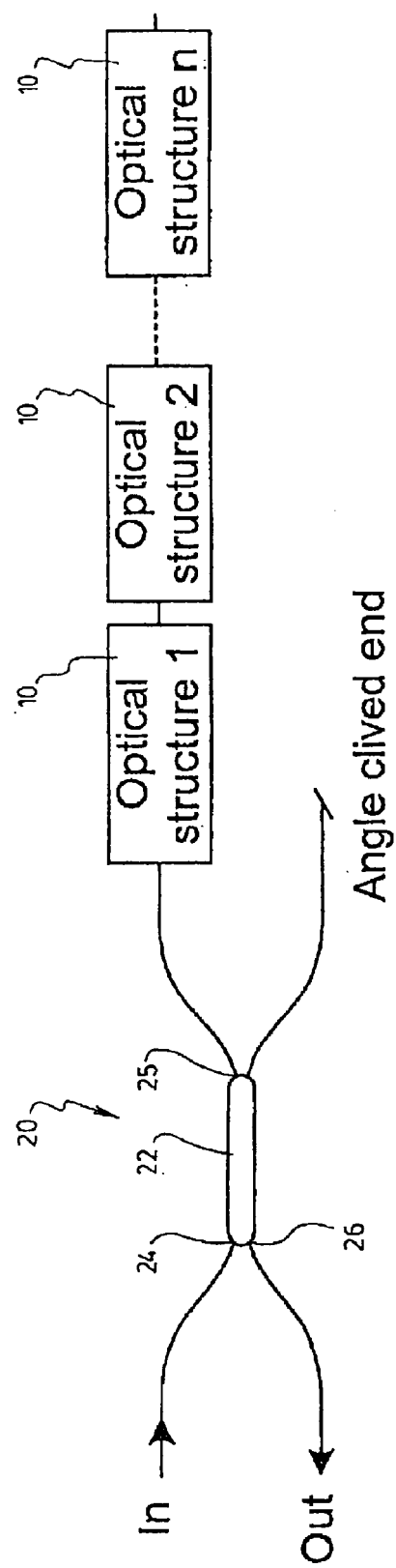
FIG. 8B shows a variant to the embodiment of FIG. 8A.

The compensator 20 includes an optical structure 10 as described above, that is an optical waveguide having a light propagation axis z, and at least one Bragg grating provided in the waveguide across the light propagation axis z. In the embodiments of FIGS. 7A and 8A a single optical structure 10 is provided, whereas a plurality of them are shown in FIGS. 7B and 8B. Each Bragg grating has a plurality of grating components, each associated with one or a few of the wavelength channels and having a spatially variable period chosen to compensate for the dispersion of this channel (or these few channels).

The compensator 20 further includes an optical coupling device 22 coupled to the optical waveguide of the optical structure 10. The optical coupling device 22 has an input port 24 for receiving the light signal, an input/output port 25 for propagating it in the optical waveguide of the optical structure 10, where it is reflected by the Bragg grating, and an output port 26 for outputting the light signal reflected by the Bragg grating (or Bragg gratings).

In FIGS. 7A and 7B, the coupling device 22 is embodied by an optical circulator. In FIGS. 8A and 8B, it is embodied by an optical coupler such as a fused coupler. Any other device appropriate to perform a coupling function is considered to be within the scope of the present invention.

Superimposed grating components in which the chirp of each grating component is slightly different can be used as a third-order dispersion compensator. Referring to FIGS. 9A, 9B and 9C, there is shown an example of a multi-channel dispersion compensation grating that could compensate up to the third-order the dispersion accumulated over 50 km of SMF-28 fiber.

Superimposed grating components in which the chirp of each grating is different, can also be used as a dispersion slope compensator. Such a dispersion slope compensator is of interest as a complement to existing broadband dispersion compensation devices such as Dispersion Compensating Fiber (DCF). The DCF compensates properly for one channel, but since its dispersion slope does not match that of the transport fiber, an incomplete compensation occurs at the other channels. A dispersion slope compensator can then be used to precisely adjust the compensation of all the wavelength channels. For example, in 20 consecutive sections of 80 km of SMF-28 fiber each followed by 13.6 km of dispersion compensating fiber (DCF), the spectral variation of the overall dispersion is 36 ps/nm$^2$. This variation is due to the fact that the DCF compensates for the dispersion but only for about 60% of the dispersion slope. FIGS. 10A, 10B and 10C show an example of a multi-channel dispersion compensation grating that provides such a dispersion variation.

In addition to achieving a device in which the dispersion is different channel-per-channel, intra-channel variation of the dispersion can be taken into account. Instead of being linear, non-linear variation of the group delay as a function of the wavelength can be achieved. This can be of interest for intra-band slope compensation (see J. A. R. Williams et al. <<Fiber Bragg grating fabrication for dispersion slope compensation>>, IEEE Photon. Technol. Lett. 8, pp 1187–1189 (1996)). Intra-channel dispersion non-linearity may also be desired for tuning applications (see A. E. Willner, et al., <<Tunable compensation of channel degrading effects using nonlinearly chirped passive fiber Bragg gratings,>> IEEE J. of Selected Topics in Quantum Electron., 5, pp.1298–1311 (1999), U.S. Pat. No. 5,989,963 (FENG et al.) and J. A. Fells et al. <<Twin fibre grating adjustable dispersion compensator for 40 Gbits/s>>, Proc. ECOC 2000).

The dispersion compensators of the above embodiments compensate for predetermined values of the dispersion slope, that is the spatially variable Bragg wavelength of each grating component is selected in view of the dispersion experienced by the corresponding channel in a known system. It could however be advantageous to be able to tune the compensator so that a same component may be used in systems having different characteristics. Tunability would also be beneficial to adapt the characteristics of a dispersion compensator in response to factors affecting dispersion such as changing traffic patterns, temperature fluctuations along the fiber, varying component dispersion levels and dispersion variations in the transmission fiber resulting from manufacturing variances.

Figure 11:
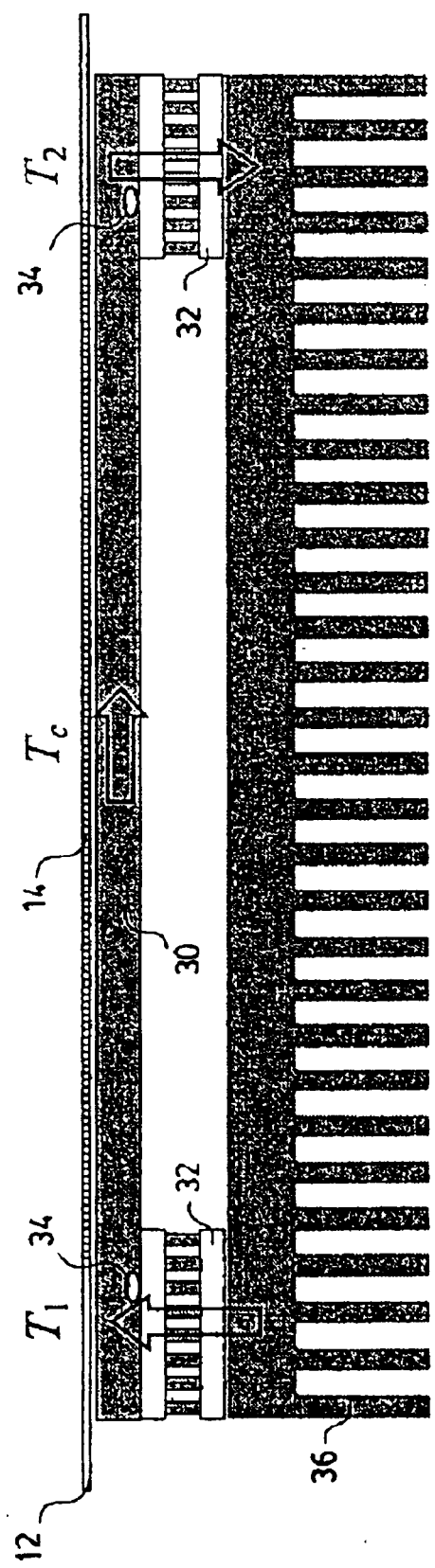
FIG. 11 is a schematic representation of a tunable multi-channel dispersion compensator according to yet another preferred embodiment of the present invention.

Referring to FIG. 11, there is therefore illustrated a further embodiment of the present invention where a tunable optical structure for the compensation of dispersion and dispersion slope is provided. The optical structure includes a waveguide, here embodied by a length of optical fiber 12, having a Bragg grating 14 therein. The Bragg grating 14 has a plurality of grating components as in the above embodiments. In the present case, the grating components are superimposed as shown in FIG. 3. Each component has a central wavelength corresponding to a given wavelength channel, and a spatially variable Bragg wavelength selected to compensate for a given chromatic dispersion. The spatially variable Bragg wavelength is defined as twice the product of the spatially variable period of the grating component and the fiber effective index along this component, which can also be spatially variable.

Tuning means are provided for tuning the spatially variable Bragg wavelength of each of the grating components. The tuning can be achieved by applying a mechanical gradient or, as in the illustrated embodiment, by applying a temperature gradient. The temperature profile is appropriately selected to adjust the spatially variable Bragg wavelength of the grating components in order to obtain the dispersion compensation corresponding to the dispersion experienced by multi-channel signals in the optical system where the compensator is used. The temperature dependence of both the period and effective index must be taken into account in this appropriate selection of the temperature profile. Preferably, the grating components are linearly chirped, before tuning, and the temperature profile is linear. This will result in a slight non-linearity of the chirp of the grating components, due to the slightly non-linear temperature dependence of the Bragg wavelength. Alternatively, the temperature profile may also include a small non-linearity selected to produce a perfectly linear induced chirp.

Preferably, the grating components should all experience the same temperature variation, and therefore be affected in the same manner. The initial spatially variable Bragg wavelength of each component and the temperature profile should therefore be selected taking this factor into consideration. In the preferred embodiment, the grating components are superimposed, automatically achieving this purpose. Alternatively, the grating components may be concatenated but arranged so as to be all subjected to the same temperature gradient, for example by looping the fiber between each grating component to superimpose the portions of fiber provided with the different grating components.

Figure 12:
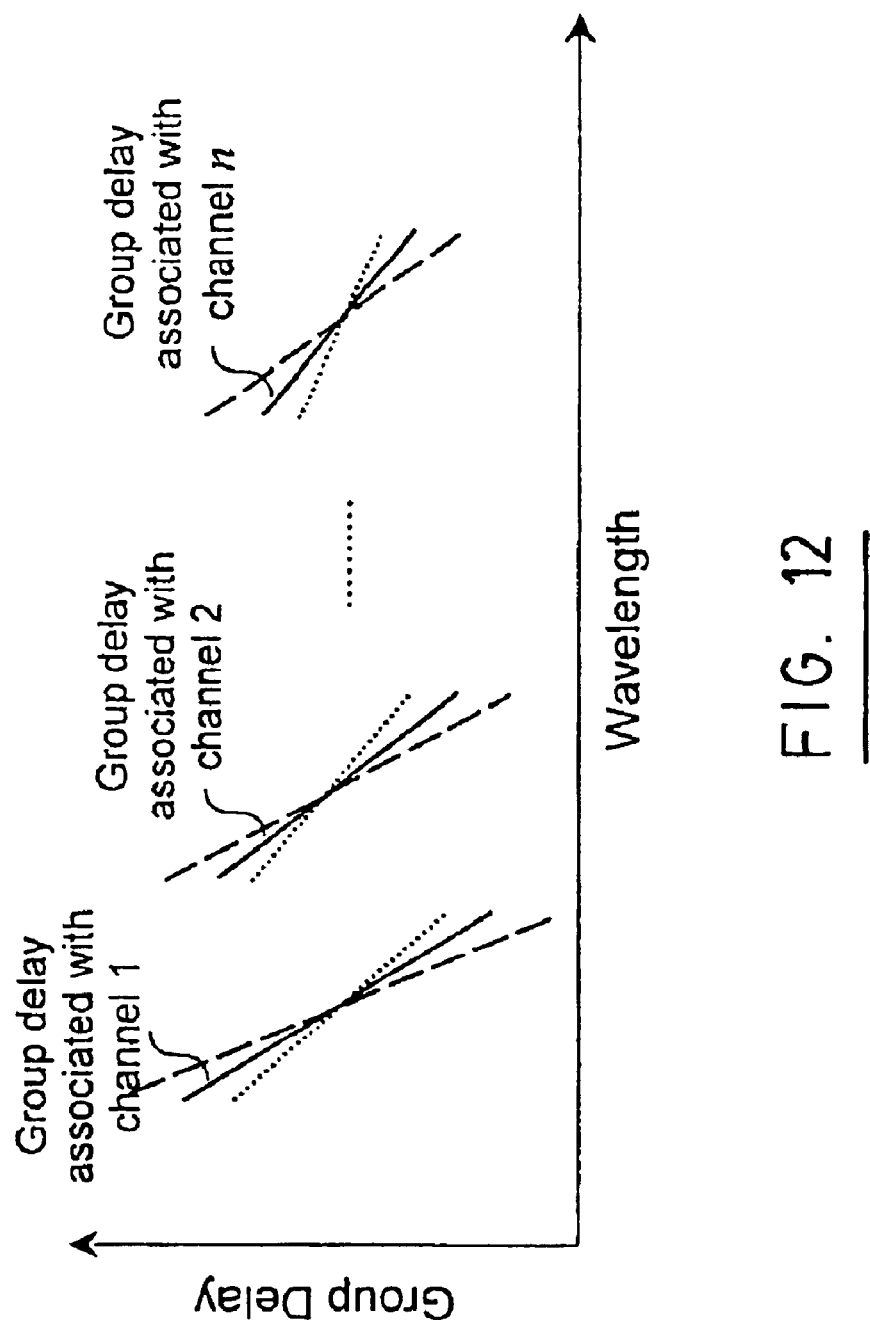
FIG. 12 is a graphical representation of the group delay, under different tuning conditions, for each channel reflected by a dispersion compensator according to the embodiment of FIG. 11.

FIG. 12 illustrates the results of tuning an optical structure according to the present invention. For each channel, the dispersion is given a different value. Changing the tuning parameters simultaneously changes the dispersion slope of all of the channels in the same manner.

FIG. 11 shows an exemplary temperature gradient inducing device for use in the present embodiment of the present invention. A Bragg grating 14 here composed of a plurality of superimposed grating components is provided in a length of optical fiber 12. The optical fiber 12 is preferably in close contact with an elongated heat conductive member called herein the natural gradient rod 30. This rod, preferably made out of a good metallic conductor, allows a uniform heat transfer along its length and thus creates a temperature gradient along adjacent fiber 12. The fiber can be coupled to this rod by numerous means, using for example a lateral groove with a thermal compound to improve thermal contact. In a preferred embodiment, the optical fiber 12 is positioned in the rod 30 such that the portion of the fiber containing the Bragg grating 14 is located at the center of the length of the rod 30.

In a preferred embodiment (not shown) the natural gradient rod is shaped as a thin cylindrical tube, preferably made of a heat conductive metal, with a small hole along its longitudinal axis into which the fiber rests freely. This preferred embodiment isolates the fiber from surrounding perturbations. A thermal compound is not required, but could be used, to ensure a good replication of the temperature profile along the natural gradient rod in the fiber. Moreover, the optical properties of the Bragg grating remain unaffected by the contact between the optical fiber and the natural gradient rod. Finally, long term reliability is increased since no mechanical stress is applied to the optical fiber at any time. Within this preferred embodiment, the fiber remains unaffected by the thermal expansion (or contraction) of the metallic rod, since they are not mechanically coupled to one another.

The natural gradient rod shall be thermally isolated from the surroundings in order to ensure the linearity of the induced thermal gradient. A dewar type thermos system, with an inner shield to improve radiation isolation, can be used for this purpose. A low emissivity construction, using for example a rod with a mirror finish surface, will further improve the performance of the device.

Referring again to FIG. 11, two heat pumping elements 32 are fixed in close physical contact at two points located at respective ends of the natural gradient rod 30, using an appropriate method like pressure mounting with a thermal compound, thermal gluing, or soldering. The heat pumping elements 32 are preferably Peltier effect Thermo Electric Coolers, referred hereafter as TECs. These elements pump heat from one side of their body to the other to fix the temperature of the extremities of the attached conductive rod 30 ($T_1$ and $T_2$), into which will settle a natural temperature gradient. In this particular approach, the temperature profile is linear. A non-linear profile may for example be applied using the technique disclosed in U.S. patent application Ser. No. 2002/048430 (HASHIMOTO), where the optical fiber is coupled to a succession of localized heaters mounted on a substrate.

On top of each TEC 32 is fixed a temperature sensor element 34, such as a thermistor or a resistance temperature detector (RTD), in close proximity to the natural gradient rod 30. These sensors 34 are fixed in close contact with an appropriate method, using for example a thermally conductive epoxy. Signals from these sensors are used as input to a servo control system (not shown) to precisely control, that is fix and maintain, the temperature at each end of the grating. Such means for temperature control are well known in the art, comprising appropriate control electronics and drive such as TEC controllers with PID servo-control for optimum dynamic operation.

Both TECs 32 are preferably directly mounted on a heat sink 36. The heat sink 36 may consist in a standard dissipative heat sink with fins or more simply in a large heat dissipation plate. It can even be the metallic casing of a packaged device. Alternatively, the TECs may be advantageously mounted on a thermally conductive metallic recirculation bar to improve the energy efficiency of the whole device. Such an assembly is for example shown in Canadian patent applications no. 2,371,106 and 2,383,807 (LACHANCE et al), both to the present assignee.

Figure 13:
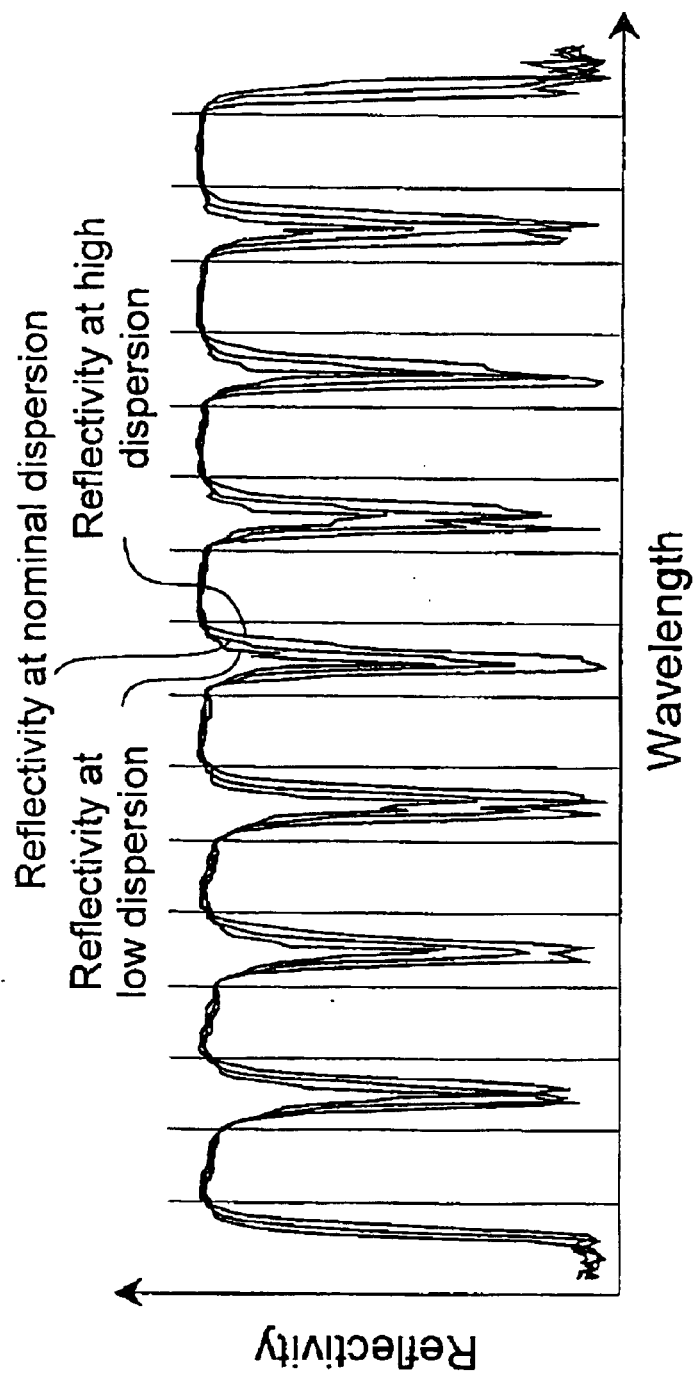
FIG. 13 shows the experimental reflectivity spectrum of light reflected by an 8 channel tunable dispersion compensator under different tuning conditions.
Figure 14:
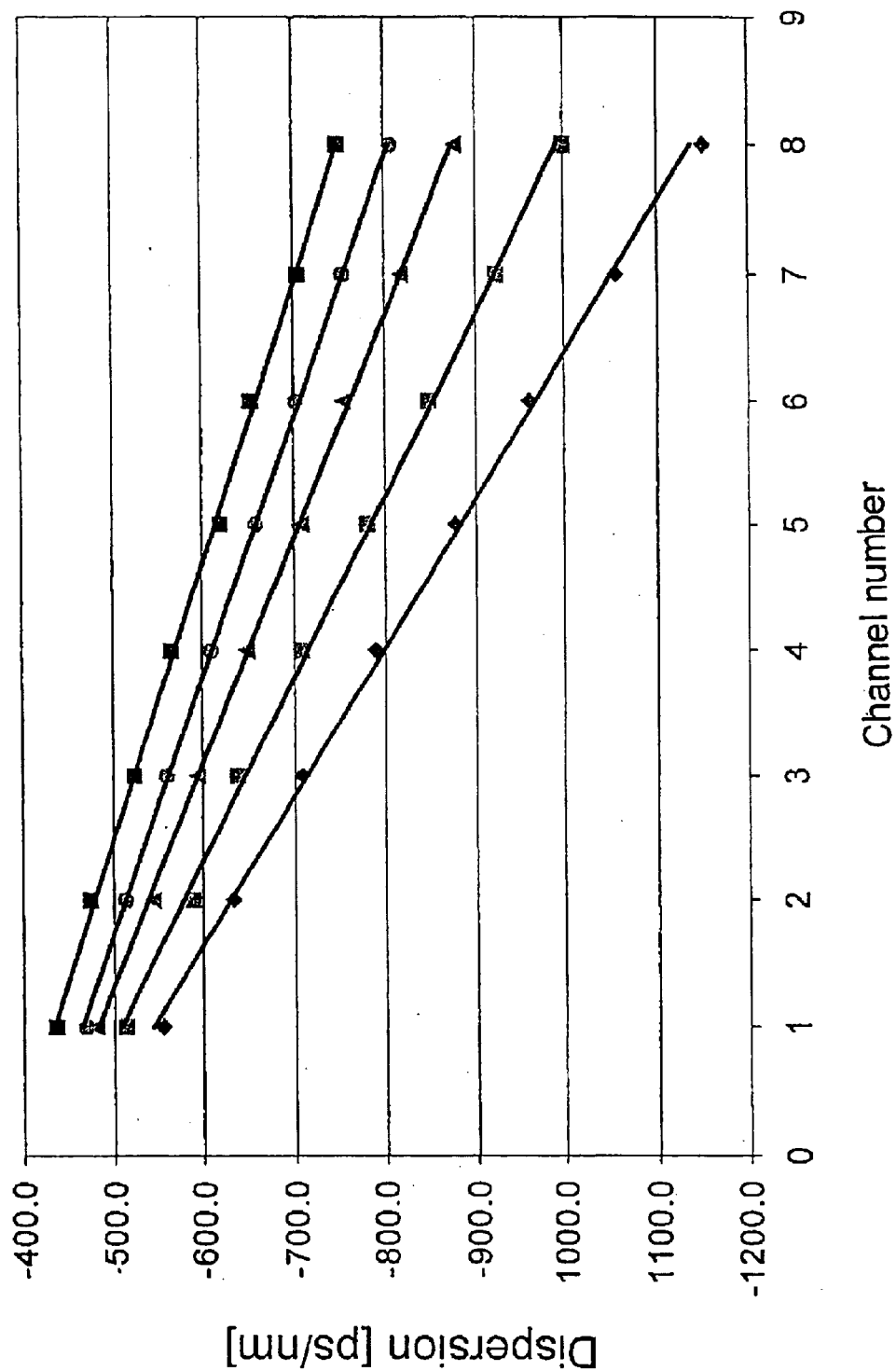
FIG. 14 shows experimental dispersion levels of a multi-channel tunable dispersion compensator for different channels.

In order to change the optical properties of fiber grating 14, an appropriate thermal gradient is induced in the natural gradient rod 30 by setting temperatures $T_1$ and $T_2$ at its extremities with heat pumping elements 32. Referring to FIGS. 13 and 14, experimental results are shown for a tunable multi-channel dispersion compensator according to the present embodiment of the invention. FIG. 13 shows the reflectivity spectrum for a series of 8 adjacent WDM channels of 0.2 nm bandwidth centered on the 50 GHz ITU grid. Under all conditions the central wavelengths remain centered on the ITU wavelengths by the preferred embodiment of the tuning method which keeps constant the central temperature of the rod of the thermal gradient inducing device shown in FIG. 11. FIG. 14 shows the variation of the dispersion level for each channel illustrating the global behavior of a multi-channel tunable chromatic dispersion compensator.

In another preferred embodiment, the dispersion and dispersion slope are tuned independently by applying temperature gradients to two optical structures coupled in such a way that the light signal is reflected thereby sequentially, the dispersion compensation of the whole device being therefore equal to the sum of the dispersion compensations provided by the individual optical structures.

In the previous embodiment of FIG. 14, the dispersion and dispersion slope vary together as the temperature gradient is tuned. Since a single parameter is adjusted (i.e. the temperature gradient) it is not possible to obtain any combination of dispersion and dispersion slope. A cascade of two such thermally tuned optical structures 10 and 10', as illustrated in FIGS. 15A and 15B, gives a second parameter to control (i.e. the temperature gradient of the second optical structure), allowing to control both the dispersion and dispersion slope independently.

Figure 15:
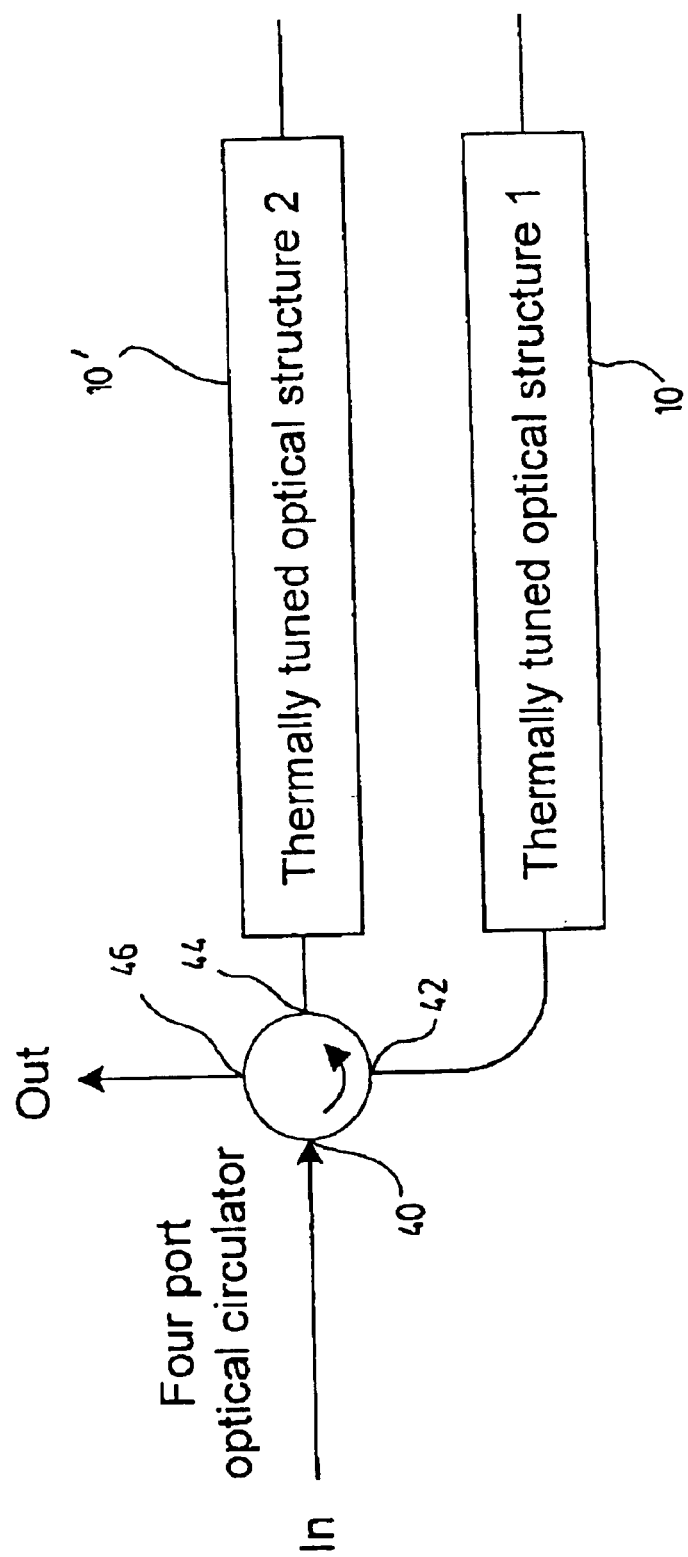
FIG. 15A is a schematic representation of a tunable multi-channel dispersion compensator according to a preferred embodiment of the present invention.
FIG. 15B shows a variant to the embodiment of FIG. 15A.
Figure 15B:
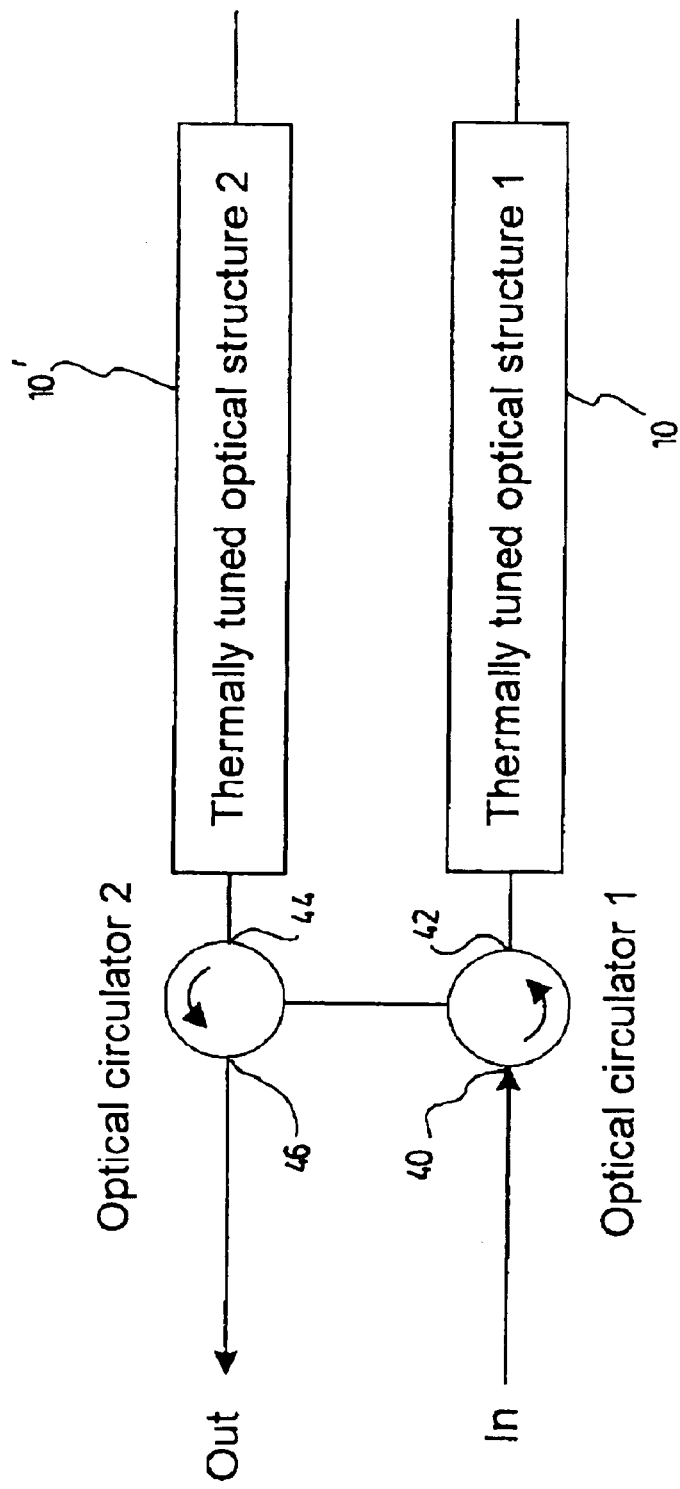

Still referring to FIGS. 15A and 15B, an optical coupling assembly is preferably provided for coupling the two optical structures 10 and 10' to each other and to the input and output of the device. The coupling assembly therefore includes an input port 40 for receiving the light signal, a pair of input/output ports 42 and 44 for sequentially propagating the light signal in the optical structures 10 and 10' and receiving the reflection thereof by the corresponding Bragg grating, and an output port 46 for outputting the light signal after reflection by the Bragg grating of both optical structures. In the illustrated example of FIG. 15A, the optical coupling assembly is embodied by a four port optical circulator. Alternatively, a pair of three port optical circulator coupled together may be used to accomplish the same result as shown in FIG. 15B.

Figure 16:
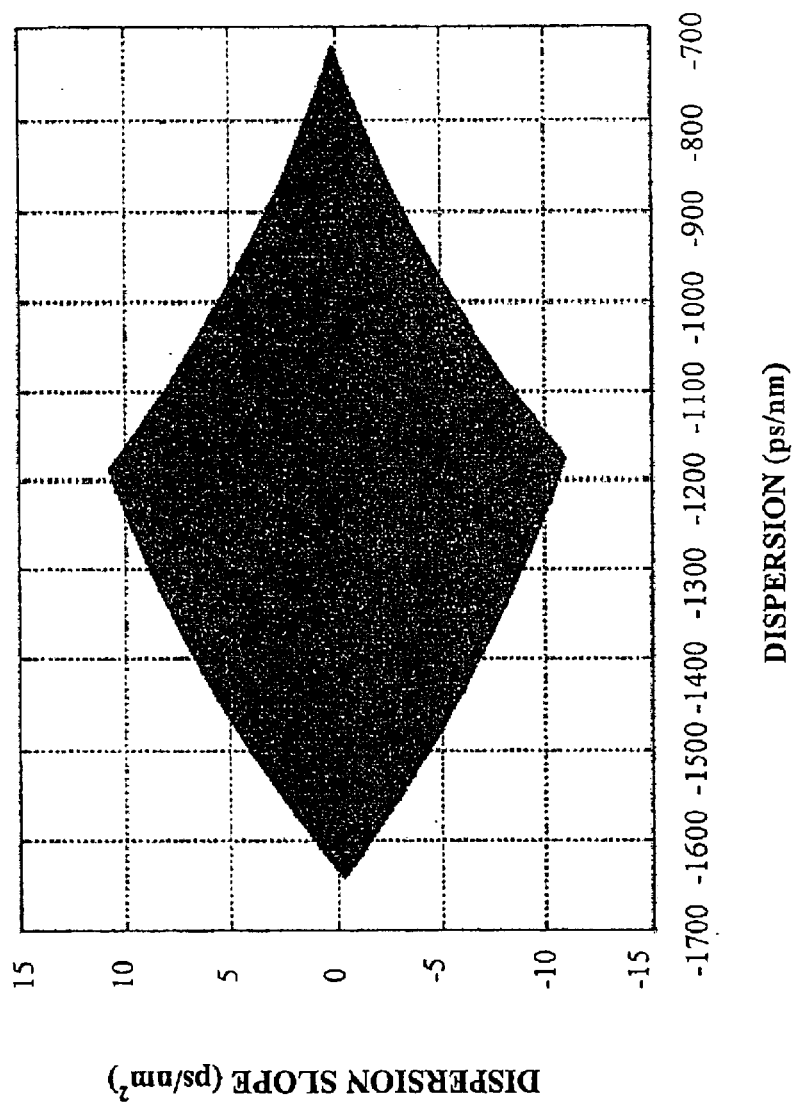
FIG. 16 shows an exemple of dispersion and dispersion slope combinations achievable according to a preferred embodiment of the present invention.

For example, using thermally tuned optical structures having a nominal (with no temperature gradient) dispersion of −500 ps/nm, and dispersion slopes of −5 and +5 ps/nm$^2$, the independent tuning of their temperature gradients allows obtaining any overall dispersion and dispersion slope within the shaded area in FIG. 16. As will be readily understood, the extreme values of available dispersion compensation may be obtained by only one combination of tuning parameters on both structures, and therefore only one dispersion slope value is possible. However, as the selected value of the dispersion approaches the middle of the shaded area, an increasing number of combinations of the tuning parameters may be selected to obtain this result, and accordingly an increasing range of dispersion slope is available.

Of course, numerous changes or modifications could be made to the embodiments described above without departing from the scope of the invention as defined in the appended claims.

What is claimed is:

1. A tunable dispersion compensator for the compensation of chromatic dispersion in a light signal having a plurality of wavelength channels, each wavelength channel having accumulated a different chromatic dispersion so that said light signal has a dispersion slope, said dispersion compensator comprising:

a first and a second tunable optical structure, each comprising:
an optical waveguide having a light propagation axis; and
a Bragg grating provided in said waveguide across the light propagation axis, said Bragg grating having a plurality of grating components, each said grating component being associated with a limited number of said plurality of wavelength channels and having a characteristic spatially variable Bragg wavelength selected to compensate for a given chromatic dispersion;

first and second tuning means for independently tuning the spatially variable Bragg wavelengths of said grating components of a respective one of said first and second optical structures; and an optical coupling assembly having an input port for receiving said light signal, a pair of input/output ports for sequentially propagating said light signal in said first and second optical structures and receiving a reflection thereof by the corresponding Bragg grating, and an output port for outputting said light signal after reflection by the Bragg grating of both of said optical structures, tuning of each said first and second optical structures by said first and second tuning means producing an independent compensation of the dispersion and the dispersion slope of said light signal.

2. A tunable dispersion compensator according to claim 1, wherein each of said first and second tuning means comprises a temperature gradient inducing device applying a temperature profile on the corresponding Bragg grating.

3. The tunable dispersion compensator according to claim 2, wherein, for each optical structure, each of said grating components is linearly chirped, and said temperature profile is linear.

4. The tunable dispersion compensator according to claim 2, wherein, for each said optical structure each said grating component is linearly chirped, and said temperature profile is selected to adjust the chirp of each said grating component to maintain linearity.

5. The tunable dispersion compensator according to claim 2, wherein, said waveguide of each said optical structure is an optical fiber.

6. The tunable dispersion compensator according to claim 5, wherein, for each said tuning means said temperature gradient inducing device comprises:

an elongated heat conductive member contacting said optical fiber along the Bragg grating; and first and second heat pumping elements contacting said heat conductive member at first and second points located on opposed side of said Bragg grating, said first and second heat conductive elements maintaining said first and second points at predetermined temperature values $T_1$ and $T_2$.

7. The tunable dispersion compensator according to claim 6, wherein each said tuning means further comprises first and second temperature sensors located at said first and second points.

8. The tunable dispersion compensator according to claim 6, wherein, for each said tuning means said heat conductive member is a metallic rod having a longitudinal cavity therethrough, said optical fiber being inserted into said cavity.

9. The tunable dispersion compensator according to claim 6, wherein, for each said tuning means said temperature gradient inducing device further comprises a heat sink connected to each of said first and second heat pumping elements.

10. The tunable dispersion compensator according to claim 6, wherein said first and second heat pumping elements of each said tuning means are Peltier effect thermoelectric coolers.

11. The tunable dispersion compensator according to claim 1, wherein said optical coupling assembly comprises a four port circulator optically coupled to said optical waveguide of each of said optical structures.

12. The tunable dispersion compensator according to claim 1, wherein said optical coupling assembly comprises a pair of three port circulators respectively coupled to said optical waveguide of each of said optical structures and being optically coupled to each other.

* * * * *